US011909210B2

(12) United States Patent
Harbaugh et al.

(10) Patent No.: US 11,909,210 B2
(45) Date of Patent: Feb. 20, 2024

(54) SYSTEMS AND METHODS FOR LOAD MANAGEMENT

(71) Applicant: Enerwise Global Technologies, LLC, Baltimore, MD (US)

(72) Inventors: Kyle Harbaugh, Baltimore, MD (US); Yanchun Wang, Campbell, CA (US); Peter Bergeron, Baltimore, MD (US); Ryan Keperling, Baltimore, MD (US)

(73) Assignee: Enerwise Global Technologies, LLC, Baltimore, MD (US)

( * ) Notice: Subject to any disclaimer, the term of this patent is extended or adjusted under 35 U.S.C. 154(b) by 258 days.

(21) Appl. No.: 17/085,974

(22) Filed: Oct. 30, 2020

(65) Prior Publication Data

US 2021/0135454 A1 May 6, 2021

Related U.S. Application Data

(60) Provisional application No. 62/927,858, filed on Oct. 30, 2019.

(51) Int. Cl.
  *H02J 3/14* (2006.01)
  *H02J 13/00* (2006.01)
  *G06Q 50/06* (2012.01)

(52) U.S. Cl.
  CPC ............... *H02J 3/14* (2013.01); *G06Q 50/06* (2013.01); *H02J 13/00028* (2020.01); *H02J 13/00034* (2020.01)

(58) Field of Classification Search
  CPC .. H02J 3/14; H02J 13/00028; H02J 13/00034; H02J 13/00006; H02J 3/144; G06Q 50/06; Y02B 70/3225; Y02B 90/20; Y04S 20/222; Y04S 40/12
  See application file for complete search history.

(56) References Cited

U.S. PATENT DOCUMENTS 6,965,319 B1 * 11/2005 Crichlow ................. H04Q 9/00
                                                                340/870.07
2008/0172312 A1 * 7/2008 Synesiou .......... H02J 13/00034
                                                                705/40

(Continued)

FOREIGN PATENT DOCUMENTS

JP           2014158408 A  *  8/2014

*Primary Examiner* — Vincent H Tran
*Assistant Examiner* — Anzuman Sharmin
(74) *Attorney, Agent, or Firm* — Greenberg Traurig, LLP; Chinh H. Pham; Joshua Rudawitz

(57) ABSTRACT

The present disclosure relates to systems and methods for optimizing resource operations within an energy network. The systems and methods can include retrieving historical interval meter data, profile data, and a curtailment plan, determining, using the historical interval meter data, estimated annual deviation of a customer's load based on average interval load divided by peak load over a given period, calculating a load curtailment for the customer based on the historical interval meter data, the profile data, the curtailment plan, and the estimated annual deviation of the customer's load, and building a report, using the load curtailment, indicating a resource commitment capability for the customer to help inform market participation and operational decision making for load curtailment and distributed energy resources (DER).

12 Claims, 19 Drawing Sheets

(56) References Cited

U.S. PATENT DOCUMENTS

| | | | |
|---|---|---|---|
| 2014/0058572 A1* | 2/2014 | Stein | G06Q 50/06 700/291 |
| 2014/0222225 A1* | 8/2014 | Rouse | H02J 3/14 700/291 |
| 2017/0236222 A1* | 8/2017 | Chen | G06Q 50/06 705/7.35 |
| 2018/0025423 A1* | 1/2018 | Utsumi | G06Q 10/04 705/37 |
| 2019/0340709 A1* | 11/2019 | Elbsat | G05B 13/026 |

* cited by examiner

| Sequences | Equipment Name | Action | Target | Target Unit | Quantity | Equipment Type | Control Method | Seasonal | Strategy | Control System | Control Protocol | Ramping kW/Min | Duration Hours | Installed Load | Installed Load Unit | Design Load kW | Average Load kW | Load Shed kW | Load Shed % | Low kW | High kW |
|---|---|---|---|---|---|---|---|---|---|---|---|---|---|---|---|---|---|---|---|---|---|
| 1 | Change operating sequences | Cycle | | % | 1 | Air handling unit, constant volume | HVAC | Summer | Main Curtailment Strategy | BMS | BacNet | 20 | 4 | | | | | 500 | 55.56 | | |
| 2 | VFDs on fans | Decrease Speed | | % | 1 | Fan | HVAC | Summer | Main Curtailment Strategy | BAS | BacNet | 10 | 6 | | | | | 200 | 22.22 | | |
| 3 | VFDs on pumps | Decrease Speed | | % | 1 | Other pump type | HVAC | Summer | Main Curtailment Strategy | BMS | BacNet | 10 | 4 | | | | | 200 | 22.22 | | |

*Fig. 13*

SYSTEMS AND METHODS FOR LOAD MANAGEMENT

CROSS-REFERENCE TO RELATED APPLICATION(S)

This application claims priority to, and the benefit of, U.S. Provisional Application No. 62/927,858 filed Oct. 30, 2019, for all subject matter common to both applications. The disclosure of said provisional application is hereby incorporated by reference in its entirety.

FIELD OF THE INVENTION

The present disclosure relates to demand management programs. In particular, the present disclosure relates to aggregating and combining qualifying entities to satisfy demand management program requirements.

BACKGROUND

Generally, utilities may create demand response requests or load curtailment programs for customers to create a balance between demand for utility usage with the available supply. Energy demand response or load curtailment are programs where companies agree to potentially reduce their electricity usage for a brief period, on demand, to help with high energy demands that may be in excess of what a power plant(s) can generate at a given point in time. Utilities may signal demand requests to customers using different methods, for example, implementing off-peak metering, in which the utility supply is cheaper at certain times of the day, and smart metering, in which explicit requests or changes in price can be communicated to customers. Customers can also respond to demand requests using different methods, for example, postponing tasks that are demanding, paying a premium for utility usage during peak periods of time, and/or transferring power consumption from the utility to private generators. Utilities can also create voluntary programs to incentivize customers to reduce usage at different times, for example, through lowing pricing during off-peak periods.

In some instances, a company such as a demand response provider or a curtailment service provider (CSP) can be authorized to act as an intermediary between utility service providers and customers to provide demand response capacity. In traditional demand response business models, each CSP is required to resell products/programs offered by program administrators with limited modification. In short, each participating customer is required to fully meet the program requirements to take advantage of the benefits. This structure creates issues for both existing and potential new customers. For existing customers, participation is limited to the lowest commitment level that can be achieved throughout the applicable program period. For potential new customers, only those who can achieve load reduction throughout the entire program period are qualified.

SUMMARY

There is a need for improvements for systems and methods used by demand response providers. The present disclosure is directed toward further solutions to address this need, in addition to having other desirable characteristics. Specifically, the systems and methods of the present disclosure can effectively reduce and/or eliminate the constraints in conventional systems and methods. Existing customers can have the capability to significantly modify their participation to better match operational constraints which will result in increased participation. Simultaneously, the addressable market can increase as multiple participants can be aggregated together to meet the product/program requirements.

In accordance with example embodiments of the present invention, a system for optimizing resource operations is provided. The system includes a database for aggregating meter data and customer information and a load data analysis module configured to retrieve historical interval meter data, profile data, and a curtailment plan and determine, using the historical interval meter data, estimated annual deviation of a customer's load based on average interval load divided by peak load over a given period. The load data analysis module is also configured to calculate a load curtailment for the customer based on the historical interval meter data, the profile data, the curtailment plan, and the estimated annual deviation of the customer's load and build a report, using the load curtailment, indicating a resource commitment capability for the customer to help inform market participation and operational decision making for load curtailment and distributed energy resources (DER).

In accordance with aspects of the present invention, the load data analysis module is further configured to receive real-time (RT) interval meter data from the customer's facility, subtract the RT interval meter data from a contracted Firm Service Level (FSL) for the delivery season to calculate a variance of the customer's expected curtailment capability, and calculate an over-commitment or an under-commitment based on the subtraction. The load data analysis module can further be configured to receive RT interval meter data from the customer's facility, subtract an expected curtailment capability of the customer's facility from a contracted curtailment volume from the curtailment plan for that delivery season Guaranteed Load Drop (GLD) for a first value, subtract the contracted curtailment volume for the delivery season Guaranteed Load Drop (GLD) from the RT interval meter data for a second value, subtract the expected curtailment capability of the customer's facility from the RT interval meter data for a third value, and determine a maximum value from the first value, the second, value, and the third value to identify a performance risk currently exposed for the customer's facility, where the maximum value indicates a performance risk currently exposed for the customer's facility.

In accordance with aspects of the present invention, the system further includes a portfolio engine for resource portfolio aggregation optimization. The portfolio engine can be configured to receive an objective function selection, receive source commitment capability report, resource costs data, resource portfolio data, and resource portfolio commitment requirements, build an optimization object function based on the resource portfolio commitment requirements, build a constraint set for the objective function selection, solve the optimization object function using the constraint set, and build an hourly commitment plan using the solved the optimization object function. Building the constraint set can include using an aggregation of resource commitments, operational limitations, and regulation limitations to build objective functions to maximize portfolio revenues, minimize portfolio operation cost, and maximize portfolio energy usage and the commitment plan can be used to optimize their resources and to reduce energy consumption cost, and to provide information for resource control system to perform control strategies.

In accordance with aspects of the present invention, the system can further include a dispatch engine for conducting real-time portfolio operation monitoring and controls. The dispatch engine configured to receive a dispatch response event for the customer's facility, collect RT interval meter data from the customer's facility, compare the RT interval meter data to an enrolled curtailment commitment, and determine, based on the comparison, whether the RT interval meter data is sufficient to satisfy an obligation for the dispatch response event. The dispatch engine can be configured to initialize mitigation procedures to dispatch additional facilities if the RT interval meter data is insufficient to satisfy the obligation and initialize mitigation procedures to decrease a number of facilities if the RT interval meter data is more than sufficient to satisfy the obligation.

In accordance with example embodiments of the present invention, a method for optimizing resource operations is provided. The method includes retrieving, by a load data analysis module, historical interval meter data, profile data, and a curtailment plan, determining using the historical interval meter data, by the load data analysis module, estimated annual deviation of a customer's load based on average interval load divided by peak load over a given period, calculating, by the load data analysis module, a load curtailment for the customer based on the historical interval meter data, the profile data, the curtailment plan, and the estimated annual deviation of the customer's load, and building a report using the load curtailment, by the load data analysis module, indicating a resource commitment capability for the customer to help inform market participation and operational decision making for load curtailment and distributed energy resources (DER).

In accordance with aspects of the present invention, the method further includes receiving, by the load data analysis module, real-time (RT) interval meter data from the customer's facility, subtracting, by the load data analysis module, the RT interval meter data from a contracted Firm Service Level (FSL) for the delivery season to calculate a variance of the customer's expected curtailment capability, and calculating, by the load data analysis module, an over-commitment or an under-commitment based on the subtraction. The method can further include receiving, by the load data analysis module, RT interval meter data from the customer's facility, subtracting, by the load data analysis module, an expected curtailment capability of the customer's facility from a contracted curtailment volume from the curtailment plan for that delivery season Guaranteed Load Drop (GLD) for a first value, subtracting, by the load data analysis module, the contracted curtailment volume for the delivery season Guaranteed Load Drop (GLD) from the RT interval meter data for a second value, subtracting, by the load data analysis module, the expected curtailment capability of the customer's facility from the RT interval meter data for a third value, and determining, by the load data analysis module, a maximum value from the first value, the second, value, and the third value to identify a performance risk currently exposed for the customer's facility, where the maximum value indicates a performance risk currently exposed for the customer's facility.

In accordance with aspects of the present invention, the method further includes receiving, by a portfolio engine, an objective function selection, receiving, by the portfolio engine, source commitment capability report, resource costs data, resource portfolio data, and resource portfolio commitment requirements, building, by the portfolio engine, an optimization object function based on the resource portfolio commitment requirements, building, by the portfolio engine, a constraint set for the objective function selection, solving, by the portfolio engine, the optimization object function using the constraint set, and building, by the portfolio engine, an hourly commitment plan using the solved the optimization object function. Building the constraint set can include using an aggregation of resource commitments, operational limitations, and regulation limitations to build objective functions to maximize portfolio revenues, minimize portfolio operation cost, and maximize portfolio energy usage and the commitment plan can be used to optimize their resources and to reduce energy consumption cost, and to provide information for resource control system to perform control strategies.

In accordance with aspects of the present invention, the method further includes receiving, by a dispatch engine, a dispatch response event for the customer's facility, collecting, by the dispatch engine, RT interval meter data from the customer's facility, comparing, by the dispatch engine, the RT interval meter data to an enrolled curtailment commitment, and determining, by the dispatch engine, whether the RT interval meter data is sufficient to satisfy an obligation for the dispatch response event, based on the comparison. The method can further include initializing, by the dispatch engine, mitigation procedures to dispatch additional facilities if the RT interval meter data is insufficient to satisfy the obligation and initializing, by the dispatch engine, mitigation procedures to decrease a number of facilities if the RT interval meter data is more than sufficient to satisfy the obligation.

In accordance with example embodiments of the present invention, a non-transitory computer readable medium having software instructions stored thereon, the software instructions configured to cause, when executed, at least one processor to perform steps including retrieving historical interval meter data, profile data, and a curtailment plan, determining, using the historical interval meter data estimated annual deviation of a customer's load based on average interval load divided by peak load over a given period, calculating a load curtailment for the customer based on the historical interval meter data, the profile data, the curtailment plan, and the estimated annual deviation of the customer's load, and building a report, using the load curtailment indicating a resource commitment capability for the customer to help inform market participation and operational decision making for load curtailment and distributed energy resources (DER).

In accordance with aspects of the present invention, the method further includes receiving real-time (RT) interval meter data from the customer's facility, subtracting the RT interval meter data from a contracted Firm Service Level (FSL) for the delivery season to calculate a variance of the customer's expected curtailment capability, and calculating an over-commitment or an under-commitment based on the subtraction. The method can further include receiving RT interval meter data from the customer's facility, subtracting an expected curtailment capability of the customer's facility from a contracted curtailment volume from the curtailment plan for that delivery season Guaranteed Load Drop (GLD) for a first value, subtracting the contracted curtailment volume for the delivery season Guaranteed Load Drop (GLD) from the RT interval meter data for a second value, subtracting the expected curtailment capability of the customer's facility from the RT interval meter data for a third value, and determining a maximum value from the first value, the second, value, and the third value to identify a performance risk currently exposed for the customer's facility, where the maximum value indicates a performance risk currently exposed for the customer's facility.

In accordance with aspects of the present invention, the method further includes receiving an objective function selection, receiving source commitment capability report, resource costs data, resource portfolio data, and resource portfolio commitment requirements, building an optimization object function based on the resource portfolio commitment requirements, building a constraint set for the objective function selection, solving the optimization object function using the constraint set, and building an hourly commitment plan using the solved the optimization object function. Building the constraint set can include using an aggregation of resource commitments, operational limitations, and regulation limitations to build objective functions to maximize portfolio revenues, minimize portfolio operation cost, and maximize portfolio energy usage and the commitment plan is used to optimize their resources and to reduce energy consumption cost, and to provide information for resource control system to perform control strategies.

In accordance with aspects of the present invention, the method further includes receiving a dispatch response event for the customer's facility, collecting RT interval meter data from the customer's facility, comparing the RT interval meter data to an enrolled curtailment commitment, and determining whether the RT interval meter data is sufficient to satisfy an obligation for the dispatch response event, based on the comparison. The method can further include initializing mitigation procedures to dispatch additional facilities if the RT interval meter data is insufficient to satisfy the obligation and initializing mitigation procedures to decrease a number of facilities if the RT interval meter data is more than sufficient to satisfy the obligation.

BRIEF DESCRIPTION OF THE FIGURES

These and other characteristics of the present disclosure will be more fully understood by reference to the following detailed description in conjunction with the attached drawings, in which:

FIG. 13 is a chart showing parts of the curtailment plan in accordance with the present disclosure.

DETAILED DESCRIPTION

Figure 1:
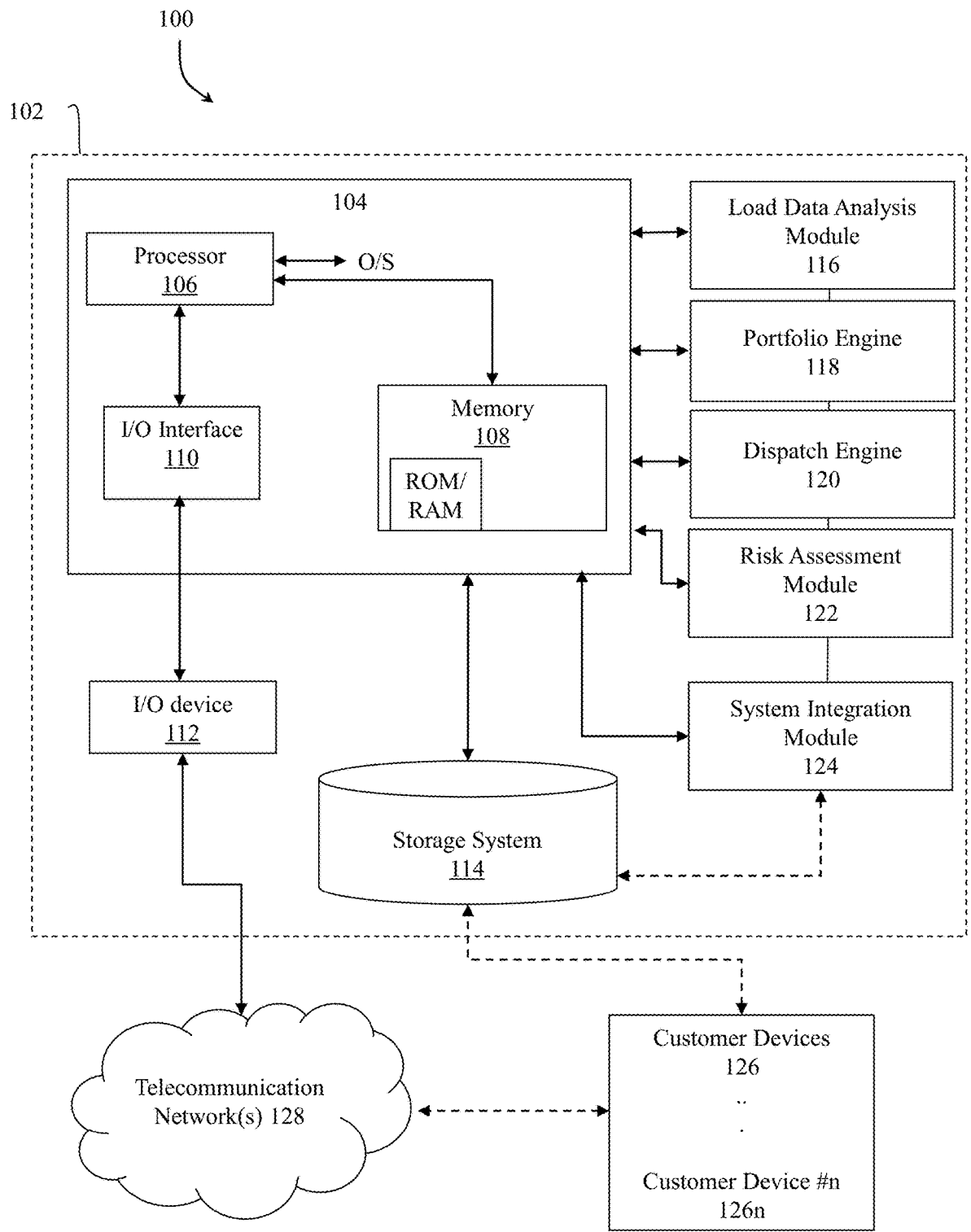
FIG. 1 is a diagrammatic illustration of a system for implementation of the present disclosure.

An illustrative embodiment of the present disclosure relates to systems and methods that provides flexibility for the aggregation and organization of demand response requirements and for end users in a manner to satisfy and participate within the demand response requirements. The systems and methods of the present disclosure allows organizations to customize demand response requirements to enable more users to fulfill the commitment to the demand management programs. The systems and methods provide a technical improvement over existing methods that are limited to one to one requirement matching between a single entity and demand management programs. Technical improvement can be provided by advancements in computing technologies and data structure organization in which enables data to be manipulated and transformed in a manner to allow multiple participants to be grouped such that they satisfy the requirements for demand management programs.

The benefits of the present disclosure over existing methods and systems includes increased participation from existing customers and enables new sites to participate in demand management programs. As it relates to customer participation, the traditional demand management model forces customers to fully comply to all independent system operator (ISO)/utility regulations for demand management programs. In contrast, the present disclosure enables customers to modify key parameters to match the operational needs and load profiles for use in demand management programs while complying with any ISO/utility regulations associated with the demand management program. This customization can drive an increase in the amount of load that can be monetized. Similarly, customers who cannot comply with all ISO/utility programs are generally excluded from participation in demand management programs. Leveraging complex aggregation and optimization models, present disclosure will enable disparate customers to aggregate their potential and participate thereby enabling the monetization of their capacity.

The present disclosure implements a unique combination of steps that provide previously unavailable load data analysis, load availability assessment, load curtailment capability and distributed energy resources (DER) commitment capability using a combination of unique processes provided by a portfolio engine for DER commitment portfolio operations, a dispatch engine, a risk assessment module, and a system integration module. The load curtailment can be the energy consumption device capacity of electrical demand reduction (e.g., in KW) when required by electrical network operators to maintain electrical network reliability and economic operations. DER commitment capability refers to DER resource capability to adjust its electrical power outputs in response to electrical grid operation needs and the DER resource owner's needs. The processes of the present disclosure can be used in combination create a practical application that provides an improvement over existing methods by increasing participation in demand request programs for fulfillment of such programs and reducing consumption of energy resources during peak power usage periods.

Definitions

Peak Load Contribution (PLC): A measurement of a given customers facility's peak load across a specified period. The Pennsylvania Jersey Maryland Interconnection (PJM) is an example of a regional transmission organization (RTO) that coordinates the movement of wholesale electricity in all or parts of Delaware, Illinois, Indiana, Kentucky, Maryland, Michigan, New Jersey, North Carolina, Ohio, Pennsylvania, Tennessee, Virginia, West Virginia and the District of Columbia. In the PJM market, the PLC value is calculated by averaging a facilities peak load across five hours which coincide with the system peaks for the PJM territory. In other markets, the measures are calculated differently but the concept remains static and represents the energy usage during peak periods.

Firm Service Level (FSL): The usage level that a customer facility has agreed be at or below during a curtailment event or test.

Guaranteed Load Drop (GLD): The amount of usage (e.g., kw) a customer is willing to reduce during a curtailment event or test.

Locational Deliverability Area (LDA): Sub-regions within a region (e.g., PJM region) used in evaluating locational constraints. LDAs include transmission zones, subzones and combination of zones.

Supervisory Control And Data Acquisition (SCADA): A centralized control system utilized for supervisory management of a serine arrays of distributed energy control assets, including programmable logic controllers (PLCs), remote terminal units (RTUs), and other sensors, valves, etc. used to collect, consolidate, and/or control energy resources in the field.

Regional Transmission Organization (RTO): A Federal Energy Regulatory Commission (FERC)-regulated electric power transmission system operator that coordinates, controls, and monitors an electric grid, typically across multiple states & municipalities, to promote economic efficiency, reliability, and non-discriminatory practices while reducing government oversight.

Independent System Operator (ISO): An organization formed at the recommendation of FERC to coordinate, control, and monitor the operation of an electrical power system to administer a region's wholesale electricity markets and provide reliability planning. Typically spans multiple states & municipalities.

Distributed Energy Resources (DER): Distributed, small (10 MegaWatts (MW) or less), grid-connected electrical generation and storage assets located close to the load demand they serve (ex.: solar, wind, hydro, battery, etc.).

Demand Response (DR): Centrally-orchestrated, economically-incentivized load demand reduction programs, typically defined by distribution region or RTO/ISO. These programs provide a demand-side mechanism (vs. increasing power generation) as a means of ensuring supply/demand balancing, and by so doing, grid reliability) to ensure matching supply at all times.

A dispatch event refers to the electrical grid operation (e.g., over an entire grid of users/customers) event initiated by electrical grid operational center (either utility or ISO) to maintain the electrical network secure and economic operations.

A dispatch event can be a series of electrical grid operational actions.

Capacity Performance (CP) is a requirement that energy generators must meet their commitments to deliver electricity.

Curtailment plan refers to an electrical system for a customer, within a system acting as part of the overall electrical grid operation, operation plan to conduct a load curtailment, which involve how to perform removal or reduction of electrical loads.

Load curtailment refers to an action, with the specific removal or reduction of electrical loads for a limited period of time from a/electrical system/utility grid system in response to a request from the utility, ISO, and/or electrical grid system operator.

Although the present disclosure discusses example implementation in relation to the above definitions, for example, RTOs and DRs, the present disclosure can be adapted for use in any combination of energy allocation programs, infrastructures, etc. and is not intended to be limited for use within the provided example embodiments.

FIGS. 1 through 13, wherein like parts are designated by like reference numerals throughout, illustrate an example embodiment or embodiments of improved operation for load demand management, according to the present disclosure. Although the present disclosure will be described with reference to the example embodiment or embodiments illustrated in the figures, it should be understood that many alternative forms can embody the present disclosure. One of skill in the art will additionally appreciate different ways to alter the parameters of the embodiment(s) disclosed, such as the size, shape, or type of elements or materials, in a manner still in keeping with the spirit and scope of the present disclosure.

Referring to FIG. 1, in some embodiments, the system 100 can be used to for load demand management in accordance with the present disclosure. FIG. 1 depicts an illustrative system 100 for implementing the steps in accordance with the aspects of the present disclosure. In particular, FIG. 1 depicts a system 100 including a load demand management system 102. In accordance with an example embodiment, the load demand management system 102 can be a combination of hardware and software configured to carry out aspects of the present disclosure. In particular, the load demand management system 102 can include a computing infrastructure with specialized software and databases designed for providing a method for optimizing reward-based campaigns. For example, the load demand management system 102 can be software installed on a computing device 104, a web-based application provided by a computing device 104 which is accessible by computing devices (e.g., the user devices 126), a cloud-based application accessible by computing devices, or the like. The combination of hardware and software that make up the load demand management system 102 can be specifically configured to provide a technical solution to a particular problem utilizing an unconventional combination of steps/operations to carry out aspects of the present disclosure. In particular, the load demand management system 102 can be designed to execute a unique combination of steps to provide an innovative approach to load demand management.

In accordance with an example embodiment of the present disclosure, the load demand management system 102 can include a computing device 104 having a processor 106, a memory 108, an input output interface 110, input and output devices 112 and a storage system 114. Additionally, the computing device 104 can include an operating system configured to carry out operations for the applications installed thereon. As would be appreciated by one skilled in the art, the computing device 104 can include a single computing device, a collection of computing devices in a network computing system, a cloud computing infrastructure, or a combination thereof. Similarly, as would be appreciated by one of skill in the art, the storage system 114 can include any combination of computing devices configured to store and organize a collection of data. For example, storage system 114 can be a local storage device on the computing device 104, a remote database facility, or a cloud computing storage environment. The storage system 114 can also include a database management system utilizing a standard database model configured to interact with a user for analyzing the database data.

Continuing with FIG. 1, the load demand management system 102 can include a combination of core components to carry out the various functions of the present disclosure. In accordance with an example embodiment of the present disclosure, the load demand management system 102 can include a load data analysis module 116, a portfolio engine 118, a dispatch engine 120, a risk assessment module 122, and a system integration module 124. As would be appreciated by one skilled in the art, the load data analysis module 116, the portfolio engine 118, the dispatch engine 120, the risk assessment module 122, and the system integration module 124 can include any combination of hardware and software configured to carry out the various aspects of the present disclosure. In particular, each of the load data analysis module 116, the portfolio engine 118, the dispatch engine 120, the risk assessment module 122 and the system integration module 124 can be configured to provide users with a system for load demand management.

In accordance with an example embodiment of the present disclosure, the system 100 can include a plurality of user devices 126 configured to communicate with the load demand management system 102 over a telecommunication network(s) 128. The load demand management system 102 can act as a centralized host, for the user devices 126, providing the functionality of the modules and engines 116, 118, 120, 124 sharing a secured network connection. As would be appreciated by one skilled in the art, the plurality of user devices 126 can include any combination of computing devices, as described with respect to the load demand management system 102 computing device 104. For example, the computing device 104 and the plurality of user devices 126 can include any combination of servers, personal computers, laptops, tablets, smartphones, etc. In accordance with an example embodiment of the present disclosure, the computing devices 104, 122 are configured to establish a connection and communicate over telecommunication network(s) 128 to carry out aspects of the present disclosure. As would be appreciated by one skilled in the art, the telecommunication network(s) 128 can include any combination of known networks. For example, the telecommunication network(s) 128 may be combination of a mobile network, WAN, LAN, or other type of network. The telecommunication network(s) 128 can be used to exchange data between the computing devices 104, 122, exchange data with the storage system 114, and/or to collect data from additional sources. The storage system 114 can include any combination of data, reports, commitments, obligations, program requirements, curtailment requirements, etc. that are discussed with respect to FIGS. 2A-10. Additionally, the data in the storage system 114 can be entered, collected, aggregated, etc. using any combination of methods known in the art and from any combination of sources known in the art.

FIGS. 2A-10 show exemplary flow charts depicting implementation of the present disclosure. Specifically, FIGS. 2A-10 depicts an exemplary flow chart showing the operation of system 100, as discussed with respect to FIG. 1.

Figure 2A:
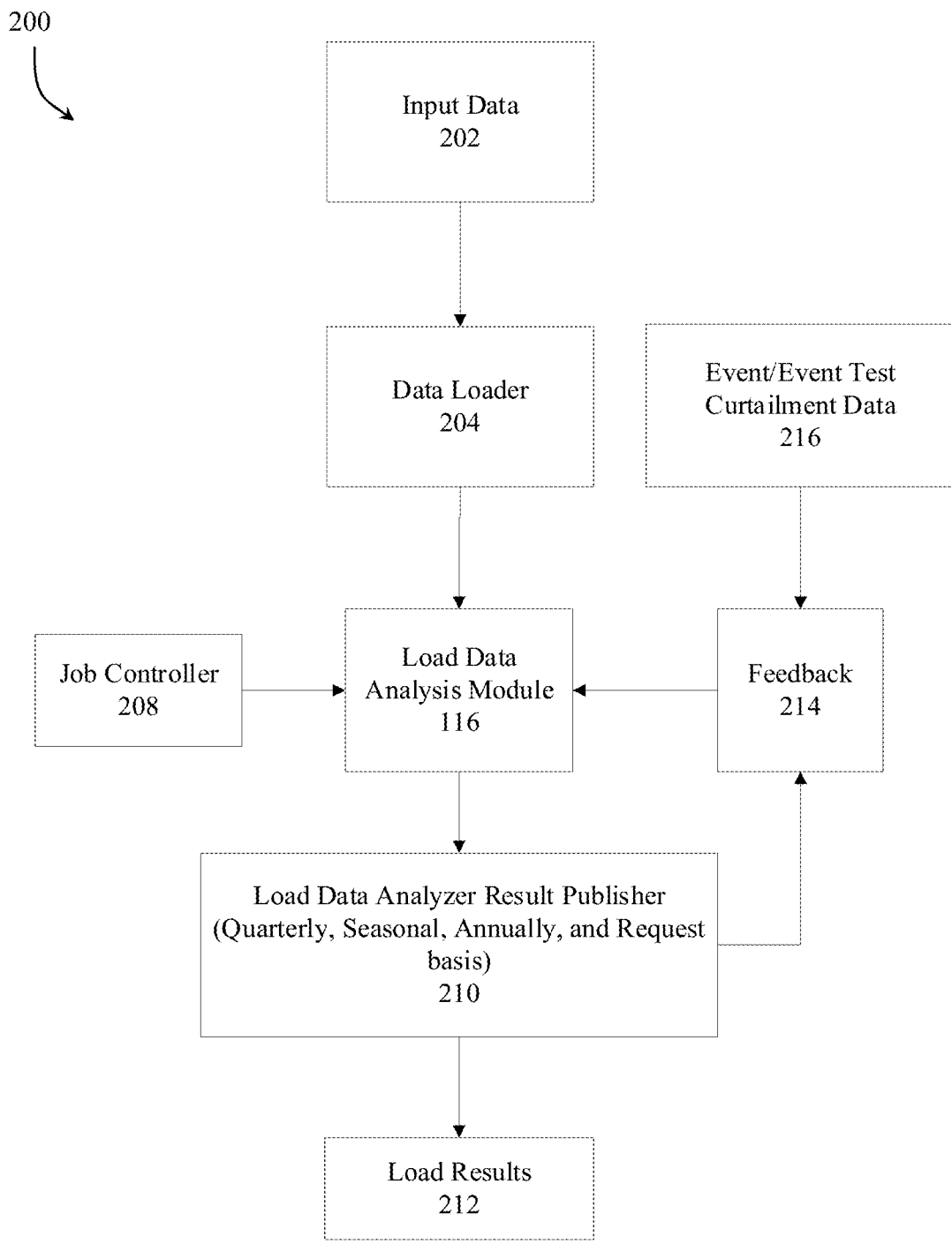
FIG. 2A is a flowchart depicting a method for implementing the load data analysis module, in accordance with the present disclosure.

Referring to FIG. 2A, in some embodiments, the load data analysis module 116 can be designed to perform a load data analysis including a load availability assessment for a customer site or resource. The load availability assessment can include any combination of systems and methods to determine the hours of greatest need for particular resources to produce or absorb energy to or from electric grid (e.g., energy). In some embodiments, the load data analysis module 116 can provide a mechanism to investigate and assess a customer's load profile, aggregating data points from a variety of sources to provide a consolidated view from which important insights can be identified. In some embodiments, the load profile of a customer can represent a historical demand for an individual site for that customer over time. The historical demand can be based on any combination of metrics, depending on the individual customer site and program participation requirements. For example, the historical demand can be based on historical interval meter readings from utility data imports and near real-time proprietary meters and telemetry. This load profile of a customer can be utilized in various utility programs, ISO markets, settlement process, and auditing processes. The results of the load availability assessment using the load profile can provide a resource to quickly and effectively evaluate customers for program participation and providing insights toward an optimized state for each customer/program.

In some embodiments, the load data analysis module 116 can be designed to calculate a load factor. The load factor can be the ratio of an average load over a period of time to a maximum level of demand or peak load. In some embodiments, the load data analysis module 116 can calculate low X percentage load factor by dividing a low X percentage average load by an average load in a specified time, as provided in Equation (1). Similarly, the low X percentage of load can be calculated by averaging the low X percentage of the load divided by the peak load in a specified time period. The values for the low X percentage load factor, the low X percentage average load, peak load, etc. can be calculated by using any combination of methods. For example, the values can be obtained via utility data imports, smart meters, etc. This factor provides demand response request system to evaluate the load availability during the shoulder hours of demand response request operations. This factor indicates the load availability level during low load operation hours over a given period.

$$f_{Load}^{X\%} = \frac{\text{Average (Low } X \text{ \% of load)}}{\text{Average Load}} \quad (1)$$

Where, the average load over a given period is calculated by averaging the interval load values, while the average low x % of load is calculated by averaging low x % interval load values. For example, for a given day, hourly load interval load values can be collected as 24 individual values, the average load is the average of 24-hourly load values, the low 12.5% loads are the 3 lowest load values from 24 hourly load values, the average of low 12.5% of load for the given day is the average of three lowest loads.

In some embodiments, load data analysis module 116 can calculate daily and hourly load factor to provide for more accurate load availability and curtailment capability assessment. Daily and hourly average load factor can be defined as the average load of the given day (or hour) divided by the average load, the maximum load, firm service level, and peak load contributor (PLC) in a specified time as given in Equations (2) through (9). Hourly and daily load factors indicate the load availability levels over a given study period.

$$f_{Load(Avg)}^{Day(s)} = \frac{\text{Average load of selected Day(s)}}{\text{Average Load}} \quad (2)$$

Equations (2) produces an index representing a facility's average load value over a specific day relative to the facility's average load value over a defined period (generally a week, month, season, or year).

$$f_{Load(Avg)}^{Hour(s)} = \frac{\text{Average load of selected Hour(s)}}{\text{Average Load}} \quad (3)$$

Equations (3) produces an index representing a facility's average load value over a specific hour relative to the facility's average load value over a defined period (generally a week, month, season, or year).

$$f_{Load(Max)}^{Day(s)} = \frac{\text{Average load of selected Day(s)}}{\text{Maximum Load}} \quad (4)$$

Equations (4) produces an index representing a facility's average load value over a specific day relative to the facility's maximum load value across a defined period (generally a week, month, season, or year).

$$f_{Load(Max)}^{Hour(s)} = \frac{\text{Average load of selected Hour(s)}}{\text{Maximum Load}} \quad (5)$$

Equations (5) produces an index representing a facility's average load value over a specific hour relative to the facility's maximum load value across a defined period (generally a week, month, season, or year).

$$f_{Load(FSL)}^{Day(s)} = \frac{\text{Average load of selection Day(s)}}{FSL} \quad (6)$$

Equations (6) produces an index representing a facility's average load value over a specific day relative to the facility's contracted Fixed Service Level (FSL) for the delivery year.

$$f_{Load(FSL)}^{Hour(s)} = \frac{\text{Average load of selection Hour(s)}}{FSL} \quad (7)$$

Equations (7) produces an index representing a facility's average load value over a specific hour relative to the facility's contracted Fixed Service Level (FSL) for the delivery year.

$$f_{Load(PLC)}^{Day(s)} = \frac{\text{Average load of selected Day(s)}}{PLC} \quad (8)$$

Equations (8) produces an index representing a facility's average load value over a specific day relative to the facility's calculated Peak Load Contribution (PLC) for the delivery year.

$$f_{Load(PLC)}^{Hour(s)} = \frac{\text{Average load of selected Hour(s)}}{PLC} \quad (9)$$

Equations (9) produces an index representing a facility's average load value over a specific hour relative to the facility's calculated Peak Load Contribution (PLC) for the delivery year.

Figure 2B:
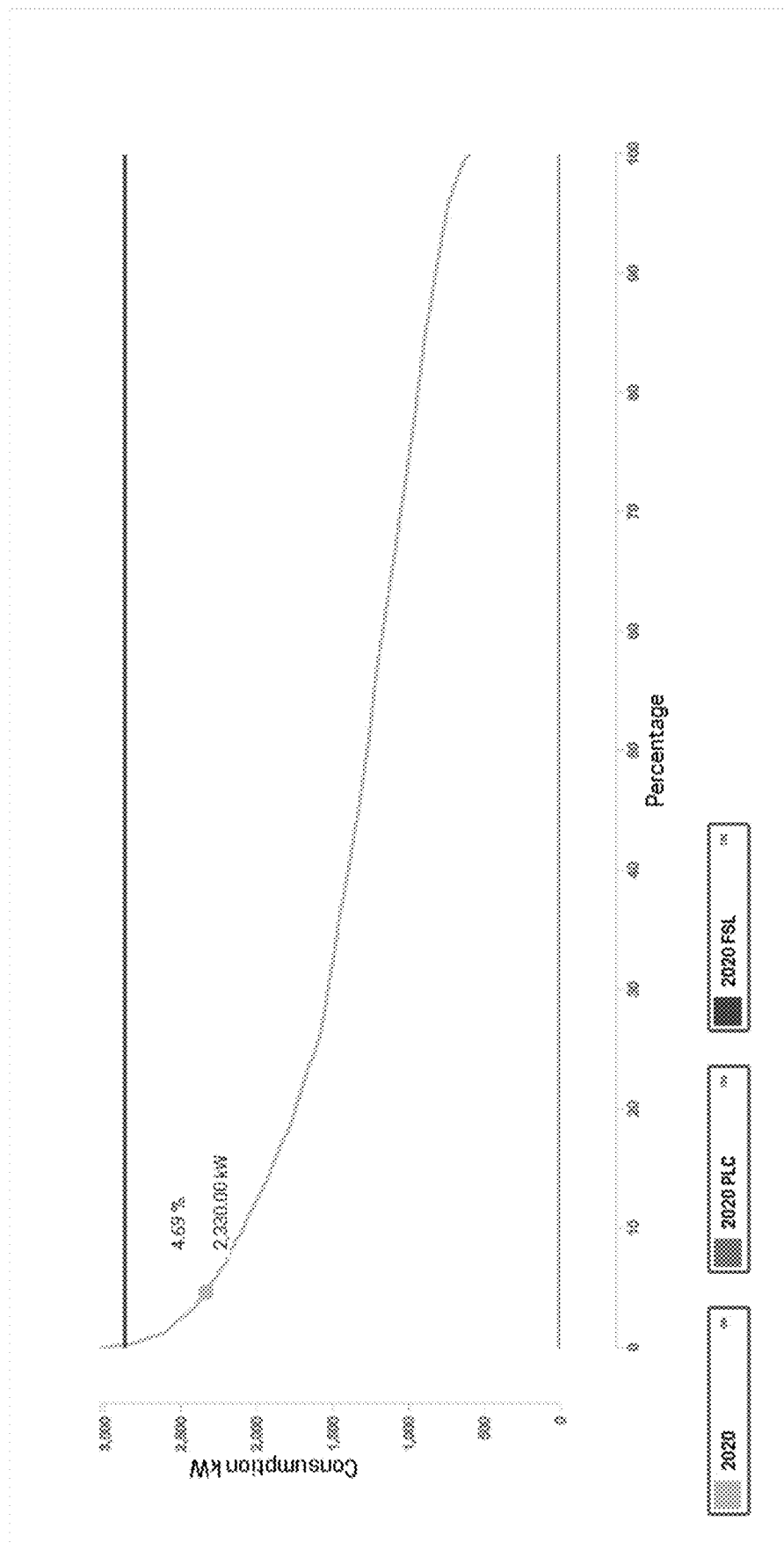
FIGS. 2B, 2C, 2D, and 2E are charts depicting results from a load data analysis module, in accordance with the present disclosure.

In some embodiments, the load availability can be assessed by using the three factors defined in Equations (1) through (9). Using, low X percentage load factor and daily and hourly load factor indices, a distribution low X percentage load distribution curve for weekdays, weekend, and holidays and daily and hourly load distribution curves for selected days or hours can be created. The load duration curve can be used to illustrate the variation of a certain load in a downward form such that the greatest load is plotted in the left and the smallest one in the right. On the time axis, the time duration for which each certain load continues during the time period is given, as shown in FIG. 2B.

In some embodiments, the load data analysis module 116 can perform a resource commitment optimization process to determine hourly portfolio schemes to meet the hourly curtailment obligations based on resource commitment capability and other resource profile information. The resource commitment capability can refer to a resource's (e.g., a customer electrical system) capability to adjust its electrical power outputs in response to electrical grid operation needs and the resource owner's needs. Resource profile information can include resource operational parameters, operational limits, and historical operational interval measurements. The resource profile information can be harvested from any combination of sources. For example, resource profile information can be harvested from a combination of sources such as ISO public notification, outage schedule system, customer site pre-setting, customer contract, resource manufactory specification, and load forecast historic data analysis. Similarly, resource profile information may include, but is not limited to, planned outage windows as proactively defined by the customer, unplanned outages sourced in near real-time as data inputs from site-level telemetry, curtailment plan specifications as jointly determined by the customer and in-house engineering resources, customer split/profitability as contracted by customer, ramp rate determined based on known curtailment strategy capabilities and constraints as well as historical performance data, current facility load based on near real-time meter data, sensitivity to weather as derived by correlation analysis of historical load profiles, etc.

In some embodiments, the load data analysis module 116 can perform a load curtailment capability assessment (such as for example load reduction), a distributed energy resources (DER) commitment capability assessment (such as for example load reallocation), and demand response request commitment assessment can be performed on a combination of load curtailment data sources with a consideration of weather adjustment and load availability constraints. In some embodiments, the curtailment capability assessment can be calculated by using a combination of historic performances, customer-confirmed curtailment plans, and customer exclusion time windows. In some embodiments, the DER resource commitment capability assessment can be calculated by using a combination of historic performance data, customer-defined operational conditions and constraints, and energy market program participation requirements and guidelines. DER resource commitment capability refers to DER resource capability to adjust its electrical power outputs in response to electrical network operation needs and the DER resource owner's needs. In some embodiments, the demand response request can be calculated based the contracts with ISO/utility and customers. The load curtailment data sources for performing the assessments can include, for example, historical load reduction performance, curtailment plan with season adjustment, and typical percentage reduction based on load profile.

Continuing with FIG. 2A, an example structure 200 for operation of the load data analysis module 116 for performing assessments is provided. For example, the structure 200 can be used for conducting load analysis. In some embodiments, the input load data analysis module 116 can be an application designed to process historical and real-team (RT) interval meter data in different formats. For example, the load data analysis module 116 can process the historical and RT meter data from load sites or utility meter data management system and convert into standard format and input into a database. Additionally, historical can be pulled in bulk, intermittently from on-site meters and/or utilities, whereas RT interval meter data may require certain kinds of on-site meters that can communicate actual customer load data on a shortened time interval (i.e., RT meter data can be collected at a 1-minute time interval, collected every minute). The use of historical interval meter data and historical meter data can be used interchangeably and are not intended to limit the scope of the present disclosure to the use of one or the other. Similarly, RT interval meter data and RT meter data can be used interchangeably and are not intended to limit the scope of the present disclosure to the use of one or the other.

In some embodiments, weather forecast data can also input into a database for use by the load data analysis module 116 and other modules. In some embodiments, a data loader module 204 can be the database interface application to retrieve load data and weather forecast data from database based on the needs of load data analysis module 116, such as interval and study duration. For example, load data may come from real-time meter data devices, other meter data management systems in different engineering unit (Pulse count, KW or KWh), and in different intervals (1-minute interval, 5-minute interval, 15-minute interval, and hourly interval). In some embodiments, the data loader module 204 can process the raw data and convert the data to interval KW values for input into the database. In some embodiments, using the load data analysis module 116, the study period(s) can be selected by application users. Based on the users' selection, data loader retrieves the required data set from the database and feeds the data set to the load data analysis module 116 to conduct the desired study. The study period can include a time frame (start time and end time) during which the study is performed normally, it could be a day, a week, a month, a season or a year. A desired study refers to a set of load data analysis actions, for example, it could be a peak load calculation.

In some embodiments, the load data analysis module 116 can receive input data 202 (e.g., load data) from a data loader 204. The input data can include any combination of utility usage data, for example, interval usage, demand, weather forecast data, etc. In some embodiments, the input data 202 can be loaded from the data loader 204 into the load data analysis module 116 by a software application service which interfaces with different data source via different communication protocols and/or API. The data loader 204 can harvest the input data 202 using any combination of methods and can convert the input data 202 into the formats needed for performing load analyzer functions by the load data analysis module 116. The raw and/or converted input data 202 can be input into the load data analysis module 116 for further processing. For example, the load data analysis module 116 can perform load data classification, categorization, and data normalization using the input data 202.

In some embodiments, the load data analysis module 116 can also receive input data/instructions from a job controller 208. The job controller 208 can be a software application to manage the software execution process in each function module/engine and control the software job operation schedule and durations which controls the software process to provide data to the modules/engines, for example, the load data analysis module 116.

In some embodiments, using the input data 202 received and/or processed by the data loader 204 and job controller 208, the load analysis module 116 can provide the further processed data to a load data analyzer result publisher 210 to calculate quarterly, seasonally, annually and reports. The performed load data analysis results for a customer site can include: historical load performance as a variance to forecasted load, load duration curves, weather sensitivity correlations, and weather normalized load curves. Reporting of this data is generally represented as hourly actual load capacity over a variable time range. Utilization of these outputs provides meaningful customer insights and correlations regarding energy usage, timing, rhythms, etc. and feed into a forecasting algorithm to help predict customer load behavior and ultimately support portfolio aggregation and optimization strategies. The load data analyzer result publisher 210 can be a separate component or part (or a process) of the load data analysis module 116, designed to conduct load data analysis. The resulting load data can be output by the load analyzer 210 as load results 212.

Figure 2C:
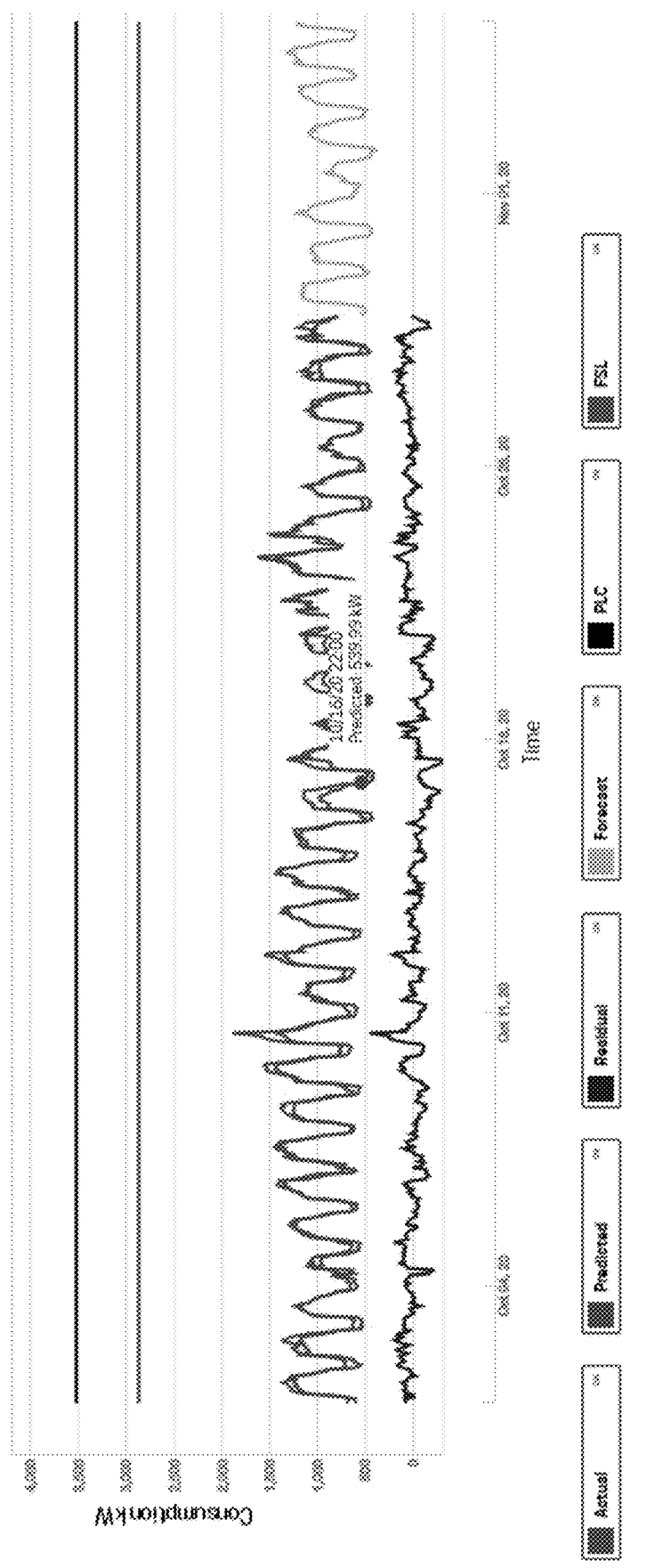
Figure 2D:
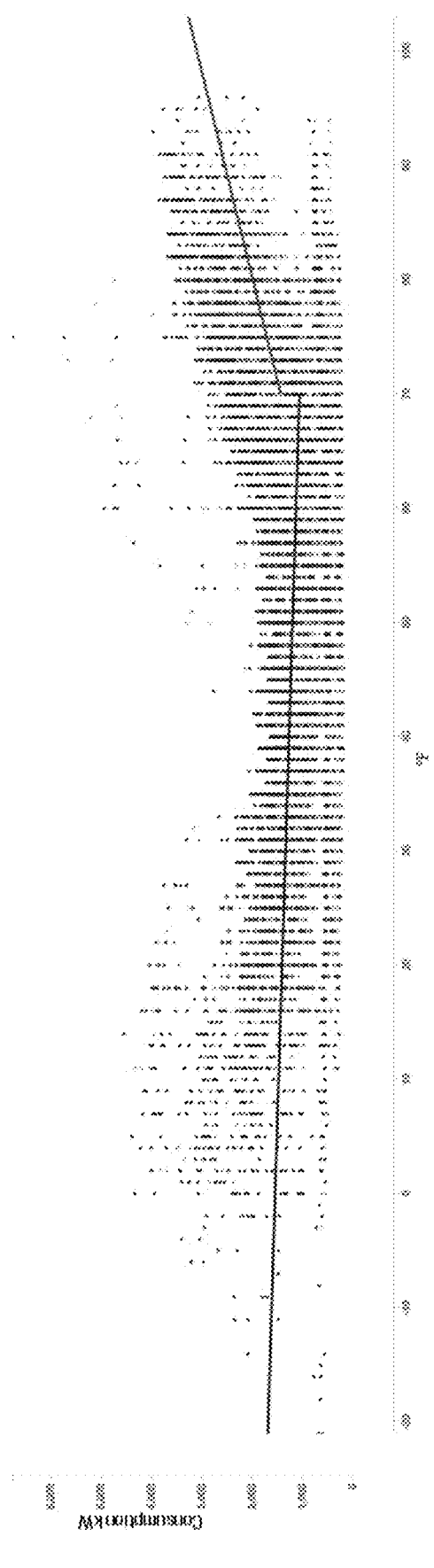
Figure 2E:
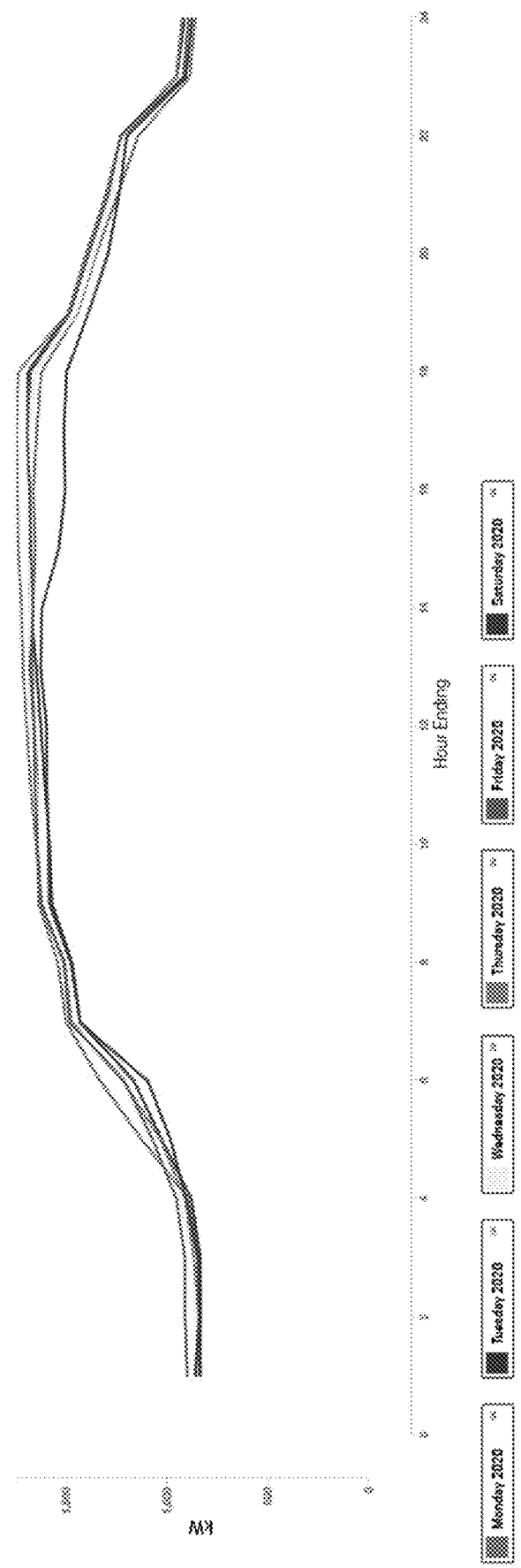

Referring to FIGS. 2C-2E, depict examples of results from the load data analysis module 116. FIG. 2C shows a load shaped curve showing a consumption in kW over time. FIG. 2D shows a weather sensitivity graph showing a consumption in kW over temperature. FIG. 2E shows a weather normalized analysis showing a consumption in kW over a different hour periods.

In some embodiments, event test curtailment data 216 and the data from the load data analyzer result publisher 210 can be aggregated as feedback data 214 to be input back into the load analysis module 116 for analysis parameter adjustments. In some embodiments, the test event curtailment data 216 can be captured as a part of the routine site performance assessment of each customer site (or electrical system operation) within the portfolio responding to a curtailment signal and/or it can be sourced from the ISO or local utility and can provide canonical interval load data for the test event window for each customer site. The site performance, in response to the curtailment signal, can offer an additional data point used to adjust the parameters used in the load data analyzer and act as input to future performance and load profile forecasting. The feedback can be designed to improve the accuracy of load data analysis, for example, when load forecast is performed, the differences between forecasted and actual values are used in load forecast model and parameter adjustments.

Figure 3:
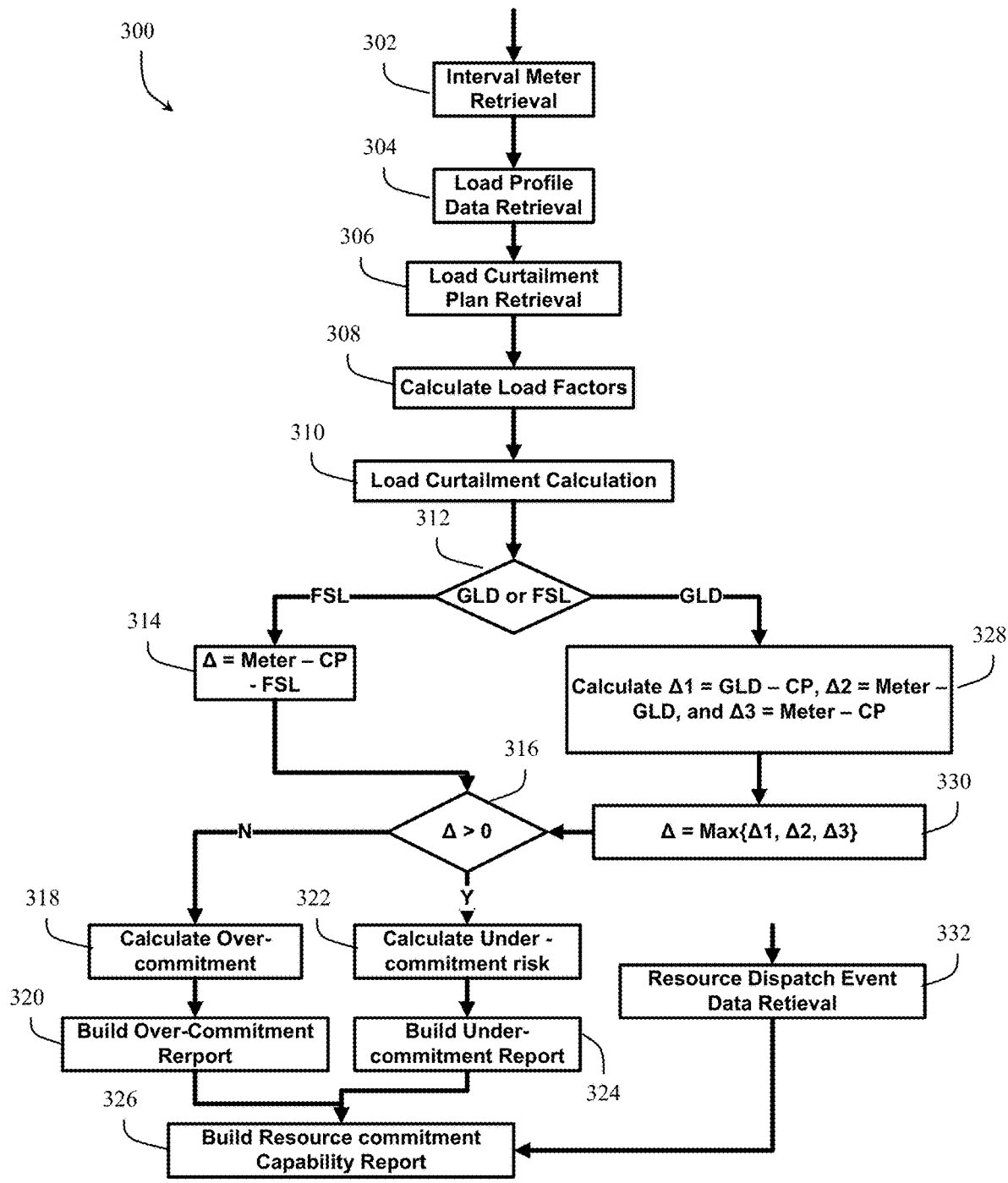
FIG. 3 is a flowchart depicting a method of performing commitment capability assessment, in accordance with the present disclosure.

Referring to FIG. 3, in some embodiments, an individual demand response resource commitment capability can be performed by using the structure 200 outlined in FIG. 2A. FIG. 3 depicts a process 300 showing example steps for individual demand response resource commitment capability assessment and for generating different reports related thereto. A resource commitment capability can refer to resource capability (e.g., for a customer system) to adjust its electrical power outputs in response to electrical grid operation needs and the resource customer's/owner's needs. For example, the process 300 can be used to create an under-commitment report, an over-commitment report, and a commitment capability report. These reports can include a combination of system pre-defined formats and user-defined formats. The information in these reports can include resource name, owner account information, interval data, program participated, program/marker obligations, forecast performance, actual performance, and financial information such as energy savings in KW and $ quantities.

At step 302, interval meter data is retrieved. The interval meter data can be live and/or historical data retrieved using any combination of systems and methods. For example, the historical interval meter data can be retrieved from aggregated data from meters and saved in the storage system 114. Some examples of historical interval meter data can be the energy consumption of a facility in a defined interval period (a total of 100 kW used in a 60-minute interval, expressed as 100 kWh). In some embodiments, to manage curtailments and for contracting and projection purposes, historical interval meter data can be collected for all customers. For example, interval meter data can be collected from customers through proprietary metering and telemetry installed in accordance with individual customer contracts as well as customer-authorized collection of utility meter data upon request directly from the serving utility. Customers can represent individual companies or sub-sets of companies and are the owner of one or more facilities (or sites), each represented as an individual interconnection point of service on the utility grid. An example of interval meter data is provided in FIGS. 12A and 12B, which show a plot with the consumption rate per hour (kWh) on the y-axis and time on the x-axis.

At step 304 of the process 300, profile data is retrieved. The profile data can be retrieved from the storage system 114 and can include any combination of site profile data, which can include: location, load industry category, firm service level (FSL), peak load contribution (PLC), historical dispatch event, program or market registrations, maximum load, minimum load, and operation hour limitation. A typical resource load profile might include historical load interval data and resource operation parameters sourced from utility or proprietary RT meter telemetry and direct input from customers, respectively. In some embodiments, the system 100 can read and parse the profile data from the various sources, then save the parsed data into an integrated database such as storage system 114.

At step 306, a curtailment plan is retrieved. The curtailment plan can be retrieved from the storage system 114 and can include a combination of curtailment equipment type, load curtailment capability, seasonal adjustment factors, and load historical performance during dispatch events. Some examples of what is included within curtailment plans can include the data elements captured and displayable as a part of a customer's or facility's curtailment plan, for example, as depicted in FIG. 13.

At step 308, load factors are calculated, for example, as discussed with respect to FIG. 2A. The load factors can be calculated by using the average interval load divided by the peak load in a specified time period. The load factors calculated in step 308 can be leveraged to determine the estimated annual deviation of a customer's load from season to season. For example, using the data from step 302, the load factors calculation result may predict a 3% increase in a customer's load by identifying changes as a trend (e.g., from the meter data) compared against historic loads. This increase (or other change) can be applied the subsequent calculation of load curtailment potential in step 310.

At step 310, a load curtailment calculation is performed. The load curtailment for a given interval can be calculated by subtracting meter reading from the expected load (baseline or forecast) over the given interval. In some embodiments, the calculation of load curtailment can leverage the following items: interval meter data, estimated load profile, curtailment plan data, assumed load factors, and systematic adjustments given current operating conditions to estimate the available curtailment potential of an individual facility and subsequent aggregation. In some embodiments, all of the data obtained in steps 302-308 can be leveraged by the load curtailment calculations.

At step 312, the load data analysis module 116 determines whether a guaranteed load drop (GLD) or firm service level (FSL) is applicable. Choosing GLD or FSL is typically determined by market/program administration requirements/guidelines and load types as identified in the following demonstration. The GLD/FSL determination can be a function of the ISO/RTO program that the facility is participating in, with the respective GLD or FSL being determined before the delivery season and committed to the ISO/RTO by both the facility customer and the service provider. The delivery season can include information for a seasonal (or other time period) enrolled committed entered into by the customer. If the load data analysis module 116 determines that GLD is applicable, then the process 300 advances to step 314 and if the load data analysis module 116 determines that FSL is applicable, then the process 300 advances to step 328. In some embodiments, when determining whether FSL is applicable, the data from steps 302, 304, and 310 can be used for the calculation.

At step 314, when a firm service level (FSL) is applicable, the variance of a facility's expected curtailment capability against a contracted Firm Service Level (FSL) for the delivery season is calculated. The curtailment capability can be pulled from another step, for example, from the load data analysis discussed herein. This calculation results can be provided in a change as a delta between these two values as a positive or negative number and can indicate the performance risk currently exposed for that facility. The change can be calculated by subtracting historical and/or RT interval meter data from capacity performance (CP), for example, based on data from the load data analysis. Then the result can be subtracted FSL. 'Meter' in this context refers to the meter data demand, or the actual load volume of the facility at a given time, retrieved in step 302. For example, the expected curtailment capability calculation can be Δ=1,250 kW (current demand, per RT facility meter data)−425 kW (expected facility curtailment capability)−850 kW (FSL for the current delivery season)=−25 kW. The resulting delta value signifies that, at the current demand, the customer site or facility is expected to be able to curtail enough load to achieve their FSL with an additional 25 kW of clearance/overperformance. The variance to FSL from resource commitment capability can be projected performance and should align with the curtailment plan, while the variance calculated in step 314 is a comparison of RT customer load performance vs that FSL. This calculation allows the system to adjust based on what is expected and actual performance at the customer site.

At step 316, the load data analysis module 116 determines whether the change from step 314 is greater than zero. If yes, the process 300 advances to step 318, if no, the process 300 advances to step 322.

At step 318, the load data analysis module 116 calculates a value(s) for over-commitment. The curtailment calculation from step 310 can determine the available load from underlying facilities and if the associated aggregation exceeds the market obligation the resulting delta is displayed as over commitment and reported in detail in the built over commitment report of step 320. As an example, if the service provider market obligation in the Baltimore Gas and Electric (BGE) zone is 10 MW but the total customer potential is 19 MW the resulting over-commitment would be 9 MW. The committed market obligation can be based on utility and/or ISO/RTO registrations or market clearing process, generally made at the beginning of a program season or obligation period. The customer potential can be based on actual historical curtailments and documented curtailment plans pre-determined and agreed-upon in conjunction with individual customers to identify specific curtailment actions that help quantify the load curtailment capabilities of that customer. The available load from an underlying facility can be measured using any combination of systems or methods, for example, by using an on-site meter data logger (e.g., the interval meter data retrieved in step 302) and transferred to the system via communication protocols, while the market obligation can be determined by market clearing process or other methods.

At step 320, the load data analysis module 116 builds an over-commitment report. The report can be built either manually by request or automatically by using pre-set formats. A report can include a combination of information, including but not limited to resource ID, resource performance, resource obligation, portfolio obligation, and amount of over-commitment. Related to step 318, the over-commitment report provides facility and aggregate level data which can detail the available load above curtailment and distributed energy resources (DER) commitment. The same example referenced above for step 318 is also applicable for this step.

At step 322, the load data analysis module 116 calculates a value(s) under-commitment risk. If the curtailment calculation from step 310 determines the available load from underlying facilities and the distributed energy resources (DER) commitment fall below the market obligation, the resulting delta is displayed as under commitment and reported in detail in the built under-commitment report provided in step 324. As an example, if the service provider market obligation in the Baltimore Gas and Electric (BGE) zone is 10 MW but the total customer potential is 9 MW the resulting under-commitment would be 1 MW.

At step 324, the load data analysis module 116 builds an under-commitment report. The report can be built either manually by request or automatically by using pre-set formats. A report can include any combination of information, including but not limited to resource ID, resource performance, resource obligation, portfolio obligation, and amount of over-commitment. Related to step 322, the under-commitment report provides facility and aggregate level data which details the available load below curtailment. The same example referenced above for step 322 is also applicable.

At step 326, the information and reports built from either step 320 or 324 can be used to build a resource commitment capability report. The resource commitment capability report can be built either manually by request or automatically by using pre-set formats. The resource commitment capability report can include any combination of information, including but not limited to resource ID, resource performance, resource obligation, portfolio obligation, and amount of over-commitment. In some embodiments, the resource commitment report can be built based on resource commitment analysis, which is a process to minimize/maximize the operation cost/benefit subjected to resource constraints and obligation. Resource operation/dispatch schedules under different operation conditions are the major part of the resource commitment report. The resource commitment can be provided at an individual resource level or at a portfolio level.

At step 328, when a guaranteed load drop (GLD) is applicable (e.g., as determined in step 312), three separate calculations can be executed to help indicate the performance risk currently exposed for a given customer site or facility. Calculation #1 can subtract the expected curtailment capability of the facility from the contracted curtailment volume for that delivery season (Guaranteed Load Drop—GLD). Calculation #2 can subtract the contracted curtailment volume for that delivery season (GLD) from the current RT meter data demand. Calculation #3 can subtract the expected curtailment capability of the facility from the current RT meter data demand. The first change can be calculated by subtracting GLD from capacity performance (CP), for example, using data from the data load analysis. An example of this calculation would be $\Delta\#1=500$ kW (GLD for the current delivery season)$-625$ kW (expected facility curtailment capability)$=-125$ kW. This $\Delta$delta value signifies that, at the current state, the facility is expected to be able to curtail more than enough load and DER resources to achieve their GLD with an additional 125 kW of clearance/overperformance.

The second change can be calculated by subtracting GLD from meter. An example of this calculation would be $\Delta\#2=1,250$ kW (current demand, per facility RT meter data)$-500$ kW (GLD for the current delivery season)$=750$ kW. This delta value signifies that, at the current demand, the facility is obligated to be able to curtail down to a target RT meter reading of 750 kW during a DR event.

The third change can be calculated by subtracting RT meter reading from capacity performance (CP). An example of this calculation would be $\Delta\#3=1,250$ kW (current demand, per facility RT meter data)$-625$ kW (expected facility curtailment capability)$=625$ kW. This delta value delta signifies that at the current demand, the facility is expected to be able to curtail enough load and to commit enough DER resources to achieve this net load value during a DR event.

At step 330, a calculation can be performed that indicates the performance risk currently exposed for that facility based on the maximum of the three GLD-related variance calculations previously identified (in step 328). In some embodiments, the delta values for the three calculations performed in step 328 can be compared to determine which has the maximum value. The resulting maximum value from step 330 can be provided to step 316 for continued processing. In some embodiments, all three calculations can always be performed as part of this process.

If calculation #1 is the maximum value, it represents that the variance between the committed GLD and the expected curtailment capability of the facility is the highest value of the three values and indicates the greatest risk. A positive result anticipates event non-performance risk exposure. Risk is minimized if the result of this calculation is the max of the three calculated values, yet is still negative.

If calculation #2 is the maximum value, it represents that the variance between the current RT meter demand reading (e.g., as retrieved in step 302) and the committed GLD is the highest value of the three values and indicates the greatest risk. This metric also indicates an effective target load level during a DR event.

If calculation #3 is the maximum value, it represents that the variance between the current RT meter demand reading and the expected curtailment capability of the facility is the highest value of the three and indicates the greatest risk. This metric also indicates an expected achievable load level during a DR event. If this value is higher than calculation #2, it anticipates event non-performance risk exposure can be calculated by determining a max change from the three delta values in step 328.

At step 332, a resource dispatch event data is retrieved. The resource dispatch event data can be received from Independent System Operators (ISO) and utilities activate events based on predetermined criteria. Some examples of dispatch event activation criteria include, but are not limited to: capacity reserve quantities falling below a contingency threshold, unplanned outages of energy supply resources unexpectedly creating generation shortages, extreme peak loads, etc. When any of the event activation criteria are met, the ISO or utility can initiate emergency events as mitigating procedures which may include calling on demand-side resources such as service providers to reduce load in order to help temporarily relieve the demand on the grid.

When an event activation occurs, the service provider can receive notification of such activation through a number of means which include but are not limited to the following: automated machine to machine connection, API interface, email and phone call notification. When not supported directly by a system, these notifications can be logged in the dispatch engine for retrieval throughout the system architecture. Any resource dispatch event data that is retrieved can be provided to step 326 for inclusion within the build resource commitment capability report. Different types of events will have different sets of data, and the resultant report format will be different based on event type. In some embodiments, the process to generate each report can be the same.

In some embodiments, the portfolio engine 118 can be a scenario-analysis tool that allows the user to assess what-if scenarios. The what-if-scenarios can include making assessments based on a customer, zonal, and LDA-levels matching actual, aggregated customer-usage and market-commitment data sets with manual projected adjustments. The portfolio engine 118 can provide a method for efficiently viewing the portfolio impact when assumptions are made regarding load shifts at various points in the market hierarchy. The portfolio engine 118 can make assessments through the unification of varying data sets and the automation of scenario analysis.

Figure 4:
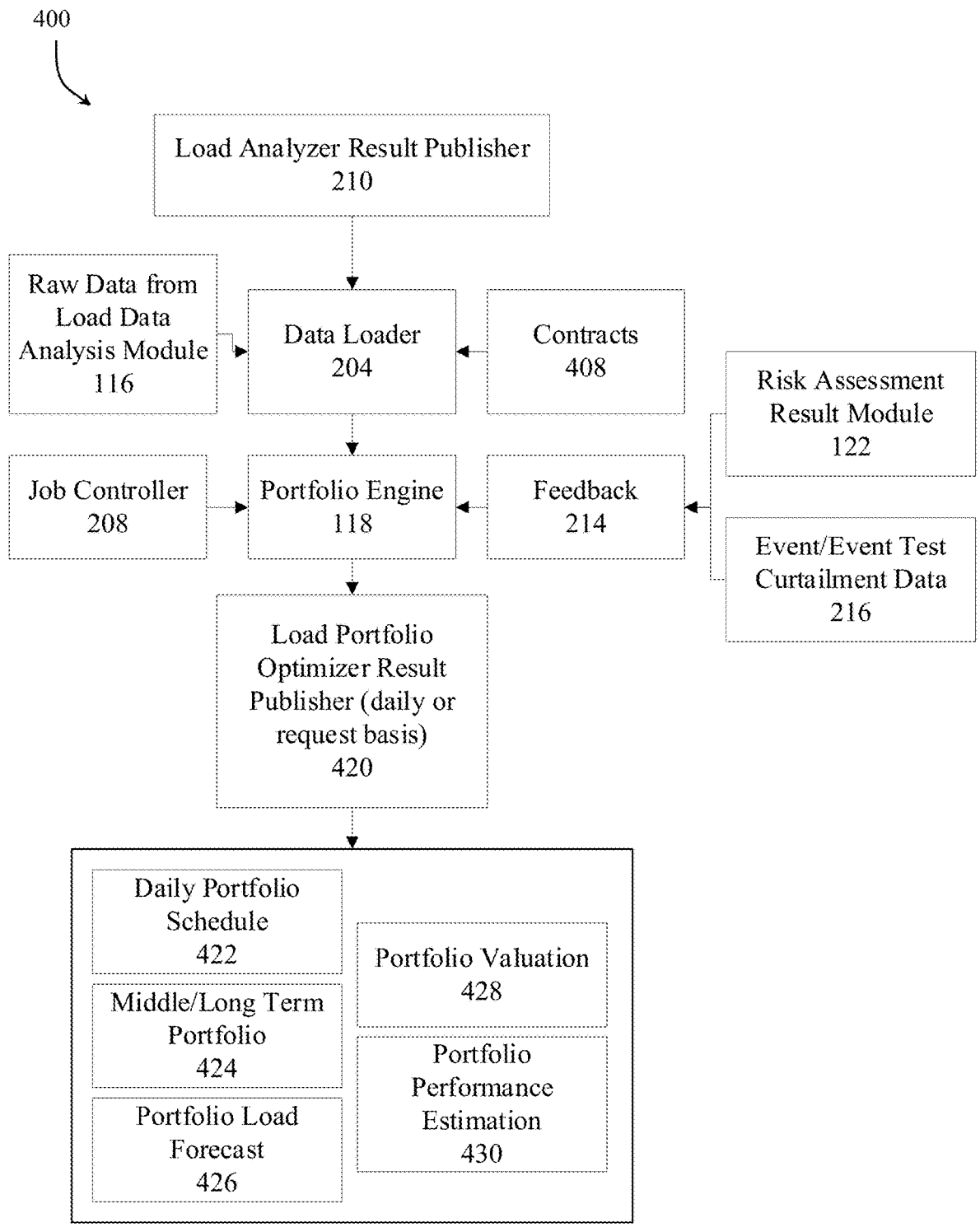
FIG. 4 is a flowchart depicting a method for implementing the portfolio engine in accordance with the present disclosure.

Referring to FIG. 4, in some embodiments, the portfolio engine 118 can be used for portfolio scheduling and portfolio planning in different market segments and programs for a customer site or resource. FIG. 4 depicts an example architecture 400 diagram for using the portfolio engine 118 for portfolio scheduling and portfolio planning. Portfolio planning can be designed to determine the optimal resource combinations for a given planning period with respect to market obligation, resource operation constraints and limitations, a base period is normally selected as historical data for future planning period. The portfolio operation can also be designed to determine near future optimal operation schedules (normally, day ahead or multiple day ahead) using more current resource information, market information, and the related portfolio planning. The portfolio engine 118 can be a software application whose function is to build a resource portfolio by optimizing aggregated resource performances in different programs (or markets), which includes total cost minimization, total benefit maximization, and performance risk minimization.

In some embodiments, raw data from the load data analysis module 116 and subsequent load analyzer result publisher 210, as discussed herein, can provide resource capabilities, availabilities, historical performances, and forecasts. The load data analyzer results 210 can provide base data for the load portfolio engine 118 via the data loader 204. Raw data from the load analysis module 116 can be the original processed data in load data analysis module 116 and can be provided via the data loader 204 for portfolio engine 118 to validate the portfolio engine results. For example, the processed data can include individual and aggregated rolling seven-day load forecast, normalized daily load patterns, load weather sensitivity, load curtailment and resource commitment capability evaluations, portfolio level load curtailment capability evaluation, curtailment plan, etc.

In some embodiments, contract information 408 can also be provided by the data loader 204 into to the portfolio engine 118 for processing. Contract information 408 provides cost and benefit information for portfolio engine 118 to conduct optimization. The cost and benefit information in a program (or market) contract can be compiled from different data sources, such as for example, resource manufacture specifications, fuel prices, annual operational costs, program (market) forward auction prices, capacity prices, and energy prices.

In some embodiments, the data loader 204 can be designed to load all data from 210, 116, and 408 into the portfolio engine 118 to perform portfolio optimization. The portfolio optimization can be achieved by following processes: (1) build the objective function(s) to either minimize or maximize the business values; (2) determine the constraints from all resources involved in the optimization process and system operation; (3) solve the optimization problem described by objective functions; (4) use the optimization results to build resource and portfolio operational schedules.

In some embodiments, the portfolio engine 118 can receive input data/instructions from the job controller 208. The job controller 208 can perform automatic process controls of portfolio engine 118 related calculations and optimizations. The automatic process controls are the software sequence execution process controls. There are multiple software processes need to start following certain sequence, which are configured in the job controller 208. The execution process can be triggered automatically by using timers and sequence controls.

In some embodiments, the portfolio engine 118 can also receive input data from feedback 214. Feedback 214 can be an interface to exchange data (in/out) with risk assessment data module 122 and grid operation data (such as event and dispatch data). The feedback 214 can be used to further optimize and tune the operation of the portfolio engine 118. Once the portfolio engine 118 calculations and optimizations are done, the load portfolio optimizer result publisher module 420 can use the results from the portfolio engine 118 to publish various outputs (include reports and saving results into a database). The portfolio engine 118 published results can include but are not limited to daily portfolio schedule 422, middle/long term portfolios 424, portfolio level load forecast 426, portfolio valuations 428, and portfolio performance estimation 430. In some embodiments, the daily portfolio schedule can be represented by a table displaying the previously-committed load output for the day ahead by site by hour, middle/long term portfolios are represented by a table displaying the previously-committed load output for the 2-7 day ahead by site, and the portfolio level load forecast can be represented by a table displaying the aggregation of the individual site schedules. Portfolio valuations are represented as a table displaying the financial impacts of the aggregated portfolio forecast and the portfolio performance estimation is represented as a table displaying the actual load projections of the aggregated portfolio forecast In some embodiments, for portfolio planning, the portfolio engine 118 can determine how to construct a portfolio to meet existing obligations (or targeting obligations) by committing demand response request resource in an optimal way. The portfolio can be constructed based on the resource availability, cost, benefit, performance, resource operation limits, and program (or market) obligation. An optimization process can be applied to minimize/maximize the total cost/benefit to construct a portfolio to meet the program (or market) obligations. In portfolio scheduling, the portfolio engine 118 can determine how to construct a portfolio to meet system operation scheduling requirements by committing demand response request resources in an optimized way with considerations to resource availabilities. The portfolio can be constructed based on the resource availability, cost, benefit, performance, resource operation limits, and system scheduling requirement. In some embodiments, an optimization process can be applied to minimize/maximize the total cost/benefit to construct a portfolio to meet system scheduling requirement. In some embodiments, for portfolio dispatch, the portfolio engine 118 can determine how to construct a portfolio to meet system dispatch requirement in an optimization with consideration of resource availabilities and real-time performance. The portfolio engine 118 can produce optimal dynamic portfolio dispatch by using current performance, un-committed available capability, and un-committed resource priority and cost. Portfolio dispatch is to solve the real-time resource operations and controls to ensure portfolio performances based on its obligation to grid operations, which were determined during portfolio planning and scheduling processes.

In some embodiment, portfolio planning optimization can be designed to solve resource middle/long term (weekly, monthly, seasonally, and annually) commitment problem, which optimizes resource commitments to minimize total portfolio cost or to maximize portfolio benefit to meet pre-determined market targets subject to resource availabilities (over the study period) and operation constraints. There are two major processes, (i.e., manually and automatically), for portfolio planning operators to initiate portfolio planning calculations. Portfolio scheduling is designed to solve near term (daily and hourly) resource operation schedules, which optimizes resource commitments to minimize total portfolio cost or to maximize portfolio benefit to meet near real-time market targets subject to system operation conditions and resource current operation conditions and constraints. There are two major processes, (i.e., manually and automatically), for portfolio schedule operators to initiate portfolio schedule calculations.

In some embodiments, five types of demand response request resource commitment optimizations can be used in the demand response request portfolio optimization processes performed by the portfolio engine 118. The five types can include cost-based demand response request commitment organization, historical performance-based demand response request resource commitment optimization, profit-base demand response request resource commitment optimization, revenue-based demand response request resource commitment optimization, and real-time portfolio dispatching.

In some embodiments, the cost-based demand response request commitment process can organize the commitment of demand response requests to meet market or program obligation at minimum costs. For example, a minimum cost objective function can be implemented by the portfolio engine 118 to determine the cost-based demand response request commitment organization as reflected the objective function as described in equation (10).

$$\min \Sigma_{i=1}^{NL}\Sigma_{t=1}^{NT}[(C_E(i,t)+C_C(i,t)\times P_D(i,t)+S_S(i,t)]\times I(i,t) \quad (10)$$

The objective function is to minimize the total cost of all resources from time interval 1 through interval NT. This function can be used in building a constraint set using an aggregation of resource commitments, operational limitations, and regulation limitations to build objective functions to maximize portfolio revenues, minimize portfolio operation cost, and maximize portfolio energy usage. Each constraint can be determined at an individual resource level, then aggregated to a portfolio level. The first term inside the bracket is the curtailment cost, which is the summary of capacity and energy costs of curtailment. The second term represents the start-up cost which depends on the length of curtailment time. $C_E(i, t)$ and $C_C(i, t)$ are the costs of energy and capacity (CSP pays resource owners for their load drops) for resource i at time t respectively, $I(i, t)$ is the commitment state of resource i at time t; $P_D(i, t)$ is the load drop or DER resource output for resource i at time t, NL is the number of resources involved in optimization process, NT is the total time intervals for optimization, and $$P_D(i, t) = \begin{cases} PLC-FSL, \text{ for } FSL \text{ load} \\ CBL(i, t)-P^F(i, t), \text{ for } GLD \text{ load} \\ P(i, t), \text{ for other } DER \text{ assets} \end{cases} \quad (11)$$

Where PLC is peak load contributor of load curtailment resources, FSL is firm service level of load curtailment resource; $CBL(i, t)$ is customer baseline for the i-th resource during time interval t, $P^F(i, t)$ is load measurement (energy) of the i-th load resource during time interval t, $P^F(i, t)$ is energy output from i-th load or DER resource during time interval t. The prevailing constraint is as follows:

$$\Sigma_{i=1}^{NL}P_D(i,t)\times I(i,t)=(1+\alpha(t))P_{Total}^{Obligation}(t) \ (t=1,2,\ldots,NT) \quad (12)$$

Where $P_{Total}^{Obligation}(t)$ is the total load curtailment obligation (Target) during interval t; $\alpha(t)$ is the obligation reserve to address unexpected curtailment or DER commitment failure ($\alpha(t)\geq 0$). This will be calculated by using historical statistic data for different seasons under different programs and markets. In some embodiments, load curtailment and DER commitment minimum and maximum limits can also be represented as:

$$P_{Dmin}(i) \leq P_b(i,t) \leq P_{Dmax}(i) \; i=1,2,\ldots,NL \tag{13}$$

In some embodiments, the profit-based demand response request commitment organization is to maximize energy service agent's profit to meet program or market obligations or financial targets with consideration of obligation reserve. The objective of the profit-based demand response request commitment organization is to maximize the CSP profit by calculating:

$$\text{Max } \Sigma\Sigma_{i=1}^{NL}\Sigma_{t=1}^{NT}[\rho_E(i,t)+\rho_C(i,t))\times P_D(i,t)]\times I(i,t) \tag{14}$$

Where $\rho_E(i, t)$ and $\rho_C(i, t)$ are the per unit net incomes of energy and capacity (CSP can collect from committing resource i in a program or market) from resource i at time t respectively; I(i, t) is the commitment state of resource i at time t.

The prevailing constraint is as follows:

$$\Sigma_{i=1}^{NL} P_D(i,t) \times I(i,t) = (1+\alpha(t)) P_{Total}^{Obligation}(t) \; (t=1,2,\ldots,NT) \tag{15}$$

Where: $P_D(i, t)$ is the optimal solution of the i-th resource during the operation time t, I(i, t) is the commitment state of resource i at time t, $\alpha(t)$ is the reserve margin factor of market (program obligation at time t, $P_{Total}^{Obligation}$ (t) is the market (program) obligation at time t. Load curtailment and DER commitment minimum and maximum limits are represented as:

$$P_{Dmin}(i) \leq P_D(i,t) \leq P_{Dmax}(i) \; (i=1,2,\ldots,NL) \tag{16}$$

In some embodiments, the historical performance-based demand response request commitment organization can be provided to maximize curtailment reliability to meet program or market obligations or financial targets with consideration of obligation reserve. Resource curtailment reliability is described by performance index ($r_i$). The objective of the historic performance-based response required commitment organization is to maximize the curtailment reliability to meet market or program obligations with consideration of obligation reserve.

$$\text{Max } \Sigma_{i=1}^{NL}\Sigma_{t=1}^{NT}[(r(i,t))]\times I(i,t) \tag{17}$$

Where: r(i, t) is the performance index of the i-th resource during time t; I(i, t) is the commitment state of resource i at time t. The prevailing constraint is as follows:

$$\Sigma_{i=1}^{NL} P_D(i,t) \times I(i,t) = (1+\alpha(t)) P_{Total}^{Obligation}(t) \; (t=1,2,\ldots,NT) \tag{18}$$

Where: $P_D(i, t)$ is the optimal solution of the i-th resource during the operation time t, I(i, t) is the commitment state of resource i at time t, $\alpha(t)$ is the reserve margin factor of market (program obligation at time t, $P_{Total}^{Obligation}$ (t) is the market (program) obligation at time t. Load curtailment and DER commitment minimum and maximum limits are represented as:

$$P_{Dmin}(i) \leq P_D(i,t) \leq P_{Dmax}(i) \; (i=1,2,\ldots,NL) \tag{19}$$

In some embodiments, the revenue-based demand response request commitment organization can be designed to maximize revenue (for CSP or resource owners) to meet program or market obligations or financial targets with consideration of obligation reserve. Resource curtailment reliability is described by performance index ($r_i$). The objective of the revenue-based demand response request commitment organization can be to maximize revenue to meeting market or program obligations with consideration of obligation reserve. This can be achieved by calculating a minimum total cost value using equation 20:

$$\text{min } \Sigma_{i=1}^{NL}\Sigma_{t=1}^{NT}[(R_E(i,t)+R_C(i,t))\times P_D(i,t)+S_S(i,t)]\times I(i,t) \tag{20}$$

Where: where $R_E(i, t)$ and $R_C(i, t)$ are the per unit net cost of energy and capacity (CSP can collect from committing resource i in a program or market) from resource i at time t respectively; I(i, t) is the commitment state of resource i at time t. The prevailing constraint is as follows:

$$\Sigma_{i=1}^{NL} P_D(i,t) \times I(i,t) = (1+\alpha(t)) P_{Total}^{Obligation}(t) \; (t=1,2,\ldots,NT) \tag{21}$$

Where: $P_D(i, t)$ is the optimal solution of the i-th resource during the operation time t, I(i, t) is the commitment state of resource i at time t, $\alpha(t)$ is the reserve margin factor of market (program obligation at time t, $P_{Total}^{Obligation}$ (t) is the market (program) obligation at time t. Load curtailment or DER Commitment limits are represented as:

$$P_{Dmin}(i) \leq P_D(i,t) \leq P_{Dmax}(i) \; (i=1,2,\ldots,NL) \tag{22}$$

This set of load curtailment or generation output limits are used as resource constraints to the optimization problem. The final optimal solution of load curtailment and DER Commitment has to be between its minimum limits and maximum limits. $P_{Dmin}(i)$ is the minimum operation limits of the i-th resource, $P_{Dmax}(i)$ is the maximum operation limits of the i-th resource, $P_D(i, t)$ is the optimal solution of the i-th resource during the operation time t.

In some embodiments, the input parameters for resource commitment organization can include resource commitment capability, resource cost information, start cost, operation cost, contract revenue, portfolio requirement, and load historical performance during dispatch events. The input parameters can be identified/defined via individual conversations and/or inputs provided by the customer and facility as part of the contracting and enrollment processes. This process can involve key energy management resources from the customer facility, as well as sales, market development, and engineering resources from the service provider. In some embodiments, the output of resource commitment organization can be a commitment plan for a predetermined period of time. For example, an hourly commitment plan, a daily commitment plan, a weekly commitment plan, etc.

Figure 5:
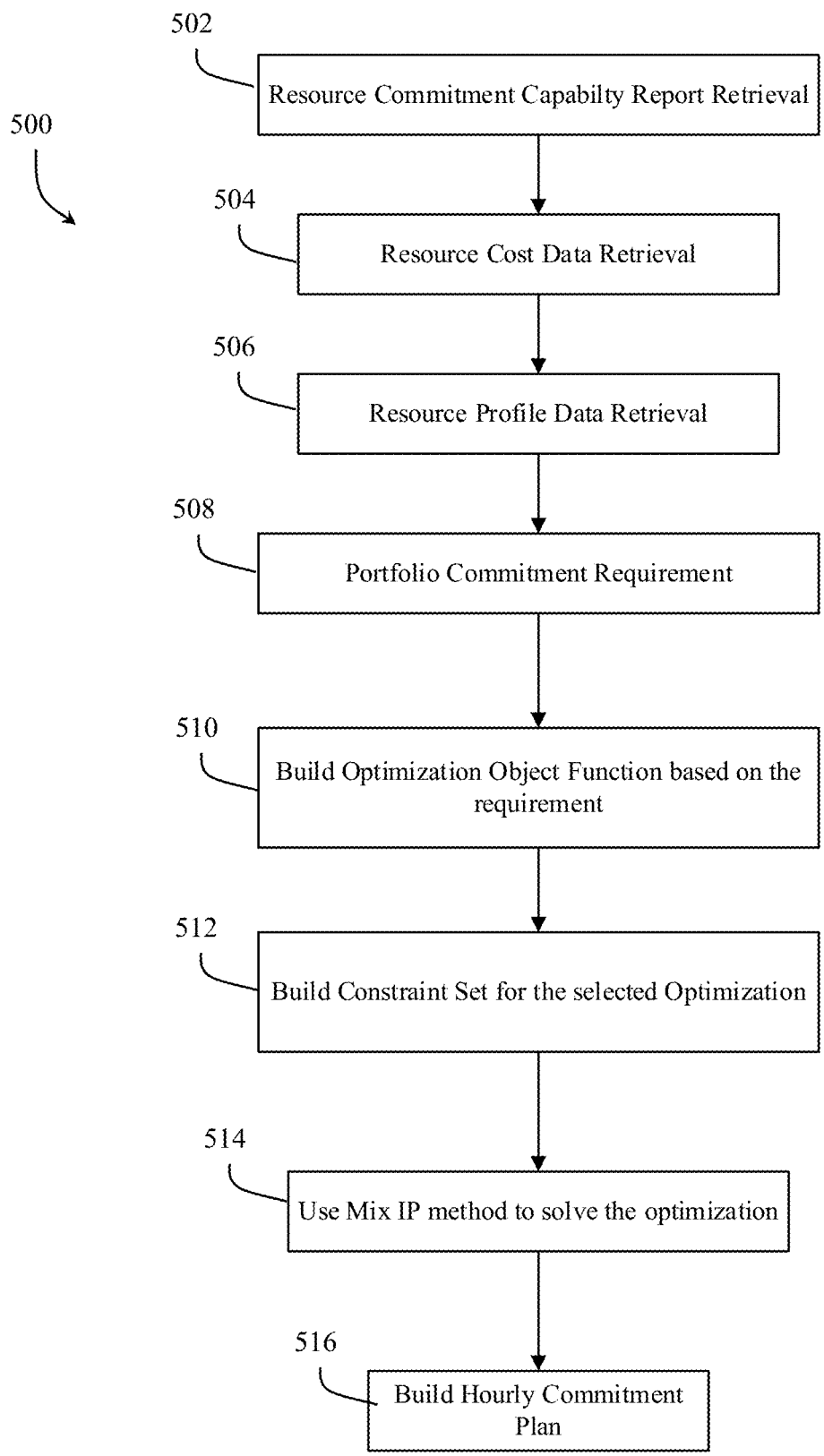
FIG. 5 is a flowchart depicting a method of performing resource portfolio optimization, in accordance with the present disclosure.

Referring to FIG. 5, in some embodiments, the portfolio engine 118 can be used for resource portfolio organization. FIG. 5 depicts an example process 500 for resource portfolio organization using the portfolio engine 118. At step 502, a resource commitment capability report is retrieved. The resource commitment capability report can be a part of the load data analyzer function 116 (step 326 of FIG. 3), utilizing historical resource performance data as the primary data input used for the calculation. In some embodiments, the resource commitment capability report can include resource control identifier, resource curtailable load in KW (for electrical load resources) under different operation conditions and operation times, resource electrical demand controllable ranges under different operation conditions and operation times, resource firm service level (FSL) in KW at different commitment periods (such as different seasons and/or months), and resource peak load contributor (PLC) in KW at different commitment periods (such as different seasons and/or months).

At step 504, resource cost data is retrieved. Resource cost data can be associated with the cost of resource demand adjustments. For example, for an electrical load, the resource cost data includes the cost of load reductions in currency (e.g., dollars $) per KWh, the start and restoring service costs in currency. All these costs can be incorporated into optimization process to minimize the cost of resource and portfolio operation adjustments. In an optimization process, the cost and benefit of conducting resource controls can be a main part of the objective function to be optimized, which determines either a maximum net benefit solution or a minimum net cost solution.

At step 506, resource profile data is retrieved. Resource profile can be a resource master data set which can include any combination including but not limited to resource identifier, location, maximum demand in KW, minimum demand in KW, ramping rate in KW/Minute, eligible markets to participate, response time in minute, restore time in minute, minimum demand adjustment time in minute, and maximum adjustment time in minute, and maximum demand interruption time.

At step 508, resource portfolio commitment requirements are retrieved. The portfolio commitment requirements can be calculated based on aggregating information, such as for example, the ISO market contract (via capacity auction results), program contract (program contracted MW), and customer contract (customer contracted MW with the Curtailment Service Provider). The resource portfolio commitment requirements can be the resource portfolio adjustment target in MW in different market and durations. In some embodiments, there can be two major types of portfolio commitment requirements. The first requirement can be the market obligation which is the market position the portfolio was awarded from open market awards. The second requirement can be the planning requirements which can be based on the financial targets, once financial target and market prices (forecast) are determined by resource operator, the portfolio requirement can be calculated as business planning.

At step 510 the portfolio engine 118 builds an optimization object function (or objective function selection) based on the resource portfolio commitment requirements, for example, as an aggregation of the resource commitments. For example, the portfolio engine 118 can build an optimization objective function which represents the optimized business objects. The portfolio engine 118 can use different objective functions to maximizing portfolio revenues, minimizing portfolio operation cost, and maximizing portfolio energy usage.

At step 512 the portfolio engine 118 builds a constraint set for the selected optimization. For example, the portfolio engine 118 can build the constraints based on resource physical limitations, resource operational limitations, and resource capabilities.

At step 514 the portfolio engine 118 uses a mix integer programming method or mixed integer programming to solve the optimization. For example, the portfolio engine 118 can feed objective functions from step 510 and constraints from step 512 into an optimization algorithm to create an optimization solution from the algorithm.

At step 516 the portfolio engine 118 can build a resource operation schedule based on the optimization solutions and can build hourly commitment plan to be implemented by a user. In some embodiments, the data retrieved from steps 502-506 can be used in steps 510-516.

Figure 6:
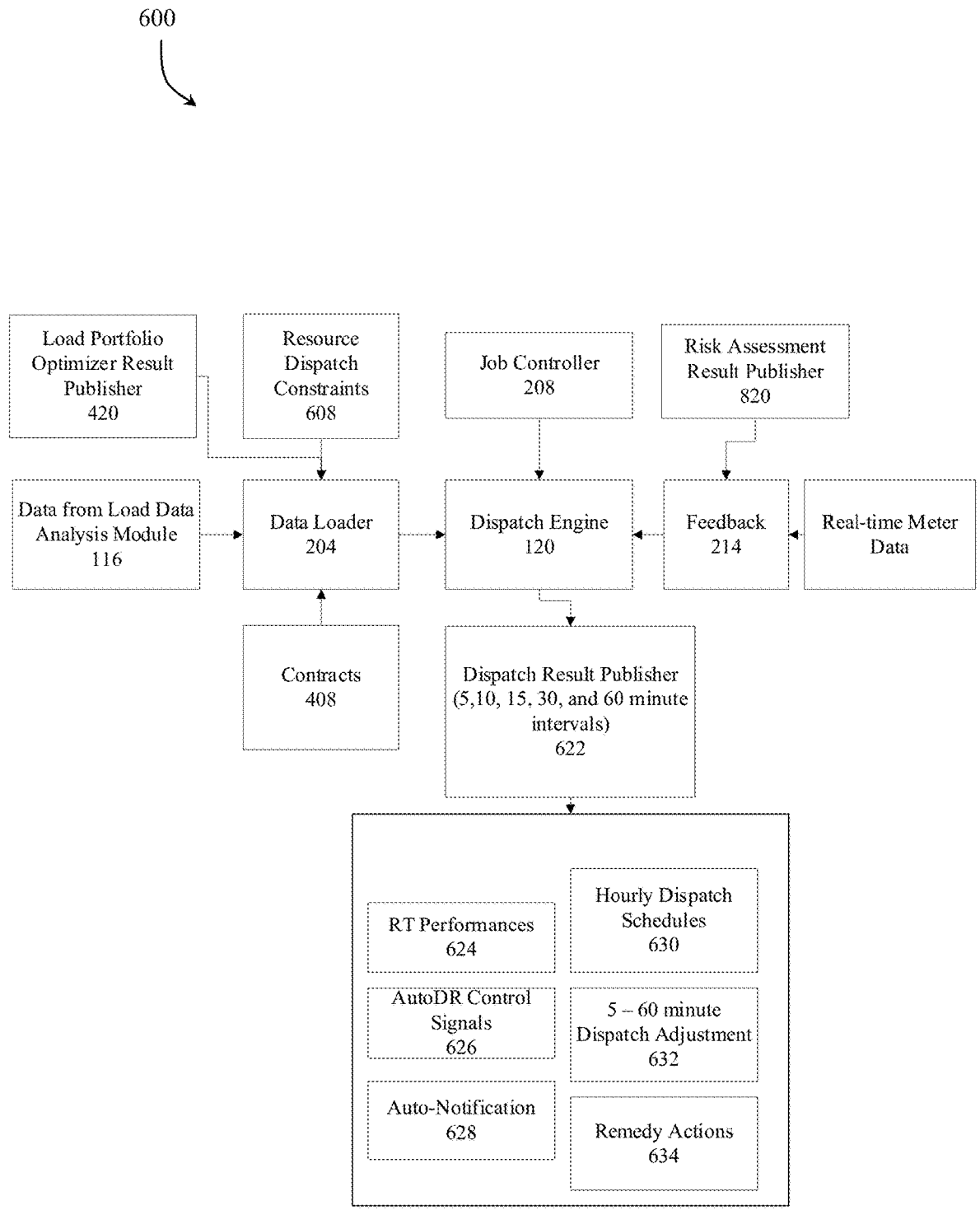
FIG. 6 is a flowchart depicting a method for implementing the portfolio dispatch engine, in accordance with the present disclosure.

Referring to FIG. 6, in some embodiments, the dispatch engine 120 can conduct real-time portfolio operation monitoring and controls. FIG. 6 depicts an example architecture 600 diagram for the dispatch engine 120 conducting real-time portfolio operation monitoring and controls. In some embodiments, the data loader 204 can perform the audit data inputs into portfolio dispatch engine 120 for real-time resource operations and controls. The input data for dispatch engine 120 can include any combination of load portfolio optimizer result publisher 420, planning and scheduling data, resource dispatch constraints and real-time availabilities 608, processed raw data from load data analysis module 116 (e.g., short-term load forecast), contract information 408 for performance calculations, real-time metering 620, and risk assessment information 618 from the risk assessment module 122.

In some embodiments, the dispatch engine 120 can receive data/instructions from the job controller 208. The job controller 208 can ensure the portfolio dispatch engine 118 follows the operation process. In some embodiments, the dispatch engine 120 can perform real-time portfolio controls and adjustment to ensure the portfolio real-time performance is meeting its obligations. Based on real-time performance calculations, some remedy actions might be issued if needed. The real-time performance can be calculated by using a combination of aggregated data, for example, real-time interval meter data and performance obligations data. Risk assessment results can be real-time meter data saved in the database, and the portfolio dispatch engine 120 can retrieves the data from the database (e.g., storage system 114).

In some embodiments, the dispatch engine 120 can also receive input data from feedback 214. Feedback 214 can be an interface to exchange data (in/out) with risk assessment result publisher 820, as discussed in greater detail herein and RT meter data. The feedback 214 can be used to further optimize and tune the operation of the dispatch engine 120.

In some embodiments, using the various data inputs, the dispatch engine 120 can calculate real-time performances for different intervals, for example, on every minute and integrate to 5, 10, 15, 30, and 60-minute values. In some embodiments, the dispatch result publisher 622 can publish results from the dispatch engine 120 in different ways, for example, on website GUI, in reports, in database for portfolio dispatch operators. The dispatch result publisher 622 can produce results that can include any combination of information, for example, including a combination of real-time performances (indices) 624, hourly dispatch schedule adjustment 630, AutoDR control signals to resources 626, 5-60 minutes dispatch adjustments 632, auto-notification to portfolio dispatch operators and related resource owners, and some further remedy actions 634. For example, the real-time performance indices provide customers with their resource response performance to a dispatch event. If under performance detected, remedy actions can be taken. Dispatch schedules for current hours and next hours can be adjusted to meet the electrical grid operation needs. The schedule adjustment can be sent to resource owners in many ways via different communication protocols, such as phone call, email, or automatic control system (AutoDR control signals).

In some embodiments, the dispatch engine 120 can implement dynamic processes for identifying an optimized set of customer resources to be called for curtailment in the event of a DR occurrence. These processes can run proactively based on a thorough understanding of expected customer load shapes in any given hour over the year and automates customer selection for call. In some embodiments, the dispatch engine 120 can also provide near-real-time responsiveness to actual customer curtailment actions during an event and can initiate additional customers for curtailment when the market obligation is not actively being met. The dispatch engine 120 can intelligently select optimized customer sets for dispatch on an ongoing basis based on the specific portfolio in that market/LDA/zone.

In some embodiments, the steps involved in the dynamic processes for identifying an optimized set of customer resources can include: (1) check the ISO/Utility/program dispatch requirements against the available curtailment capabilities from available customer resources; (2) at the beginning of dispatch, if the total resource curtailment capabilities are greater that the dispatch requirement, then commit lower cost resources up to the dispatch requirement, if the total resource curtailment capability is less that the dispatch requirement then commit all resources and issue an operational warming; (3) during the dispatch process, if real-time curtailment is more than the dispatch requirement for a given period, then can de-commit some higher cost resources to make the total curtailment close to the dispatch requirement, if real-time curtailment is less than the dispatch requirement for a given period, then can commit more resources in the dispatch process. The commitment changes can be performed manually or automatically based on results provided by the dispatch engine 120.

Figure 7A:
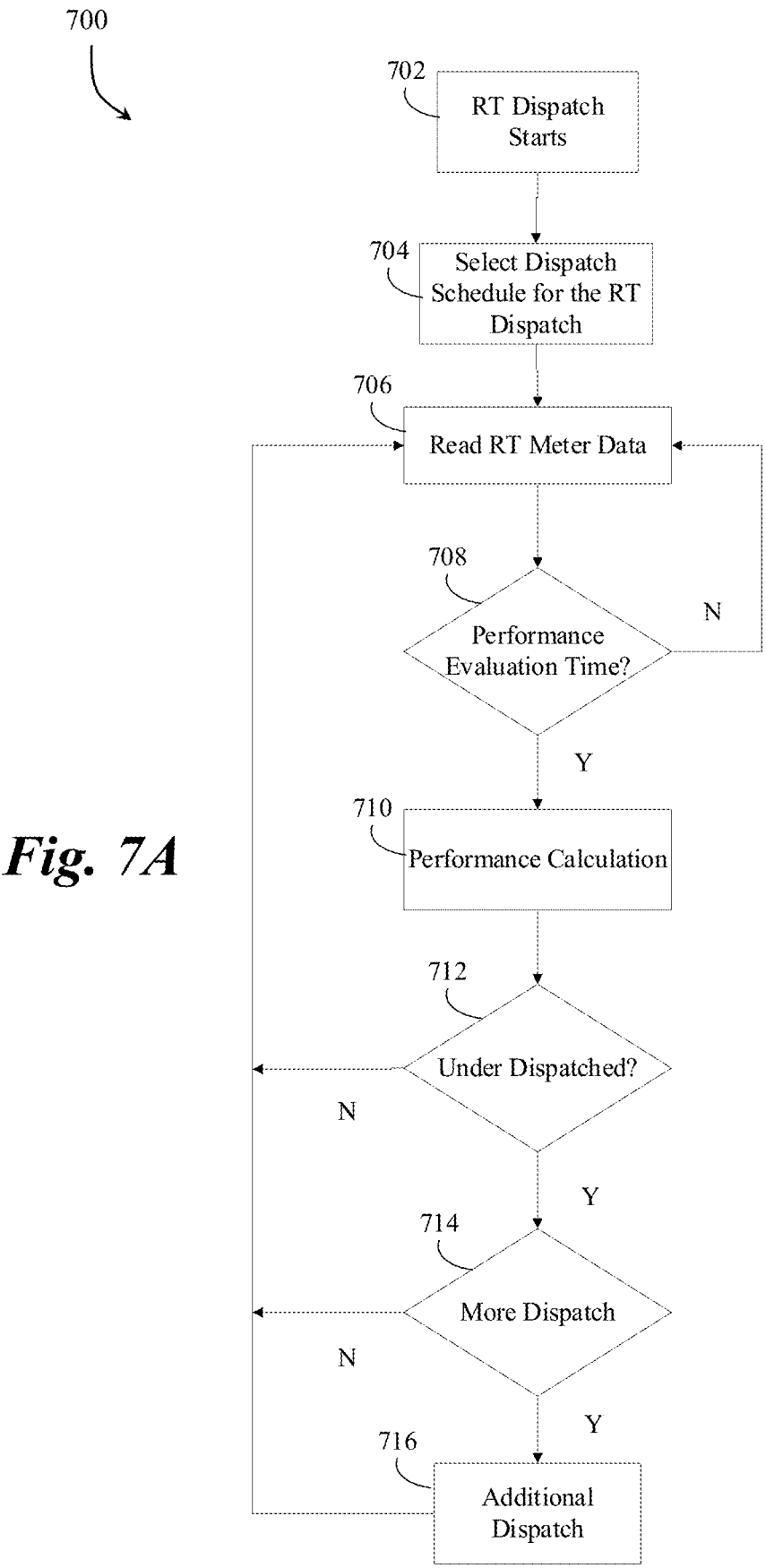
FIGS. 7A and 7B are a flowchart depicting methods for implementing the portfolio dispatch engine, in accordance with the present disclosure.
Figure 7B:
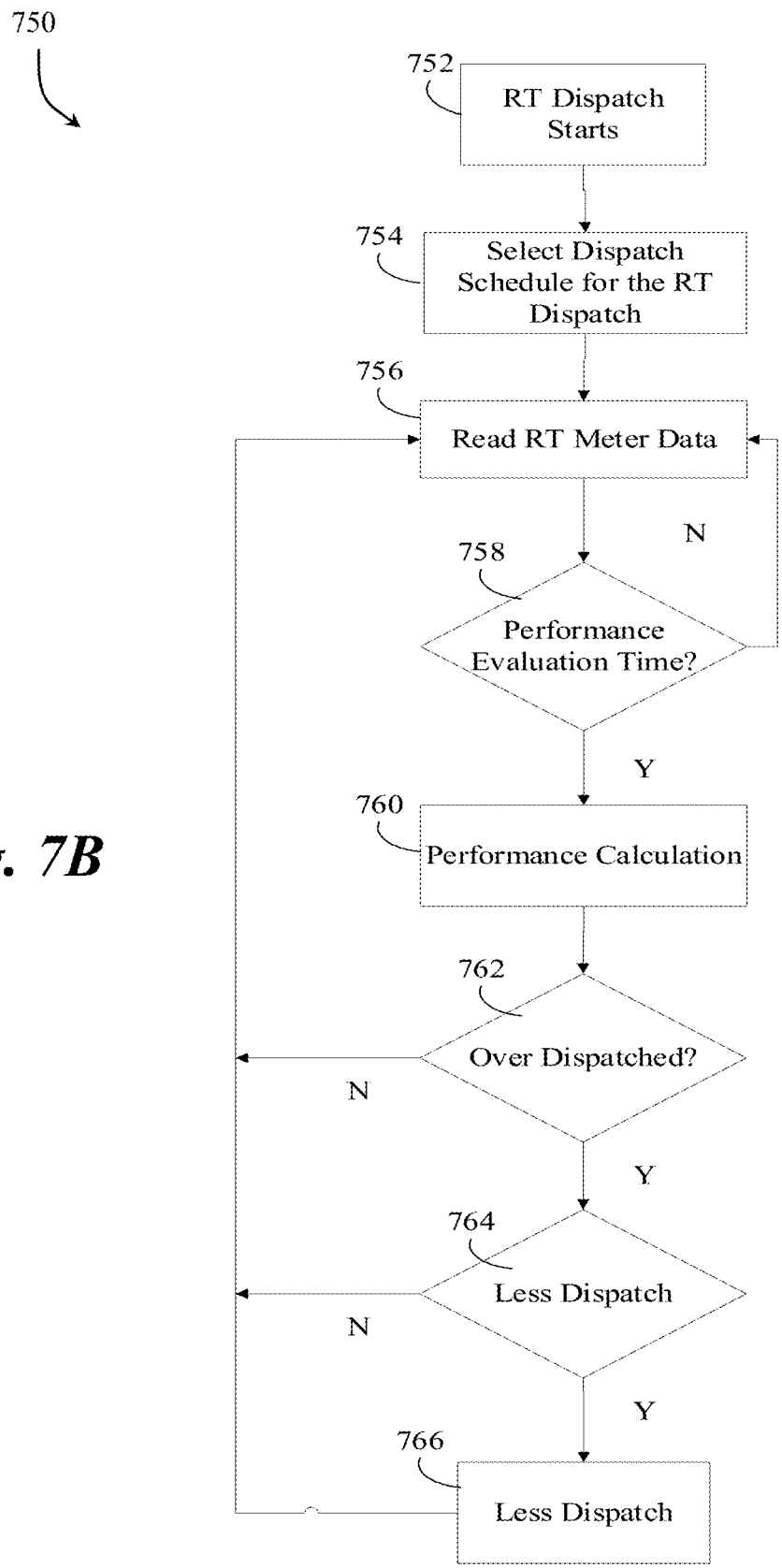

Referring to FIGS. 7A and 7B, in some embodiments, the dispatch engine 120 can be used for determining how to dispatch resources and conduct real-time dispatch adjustments for a customer site or resource/facility (dispatching would affect electrical system operations at the customer facility). FIGS. 7A and 7B depict example processes 700, 750 for operating the dispatch engine 120. The real-time dispatch monitoring and calibration process 700, 750 of the present disclosure provide for real-time demand response request resource optimal operations. In some embodiments, a performance index can be calculated on a real-time basis. This real-time performance index can be used for demand response request real-time dispatch calibration to ensure the reliability of demand response request resources during the system 100 dispatch events. The real-time performance index can be calculated in Steps 710 and 760. The real-time performance index can be defined as:

$$Pf_j(t_i) = \begin{cases} \dfrac{PLC_j - P_j^{Avg}(t_i)}{PLC_j - FSL_j}, & \text{for } FSL \text{ resource} \\ \dfrac{CBL_j(t_i) - P_j^{Avg}(t_i)}{P_j^{Obligation}}, & \text{for } GLD \text{ resource} \\ \dfrac{P_j^{Avg}(t_i)}{P_j^{Obligation}}, & \text{for distributed generation} \end{cases} \quad (23)$$

$(j = 1, 2, \ldots, NR)$

Where: $Pf_j(t_i)$ is the performance factor for resource j at time interval i ($t_i$) during an event period, $PLC_j$ is the peak load contribution of resource j, $P_j^{Avg}(t_i)$ is the average active power of resource j at time interval i ($t_i$) during an event period, $FSL_j$ is the peak firm service level of resource j, $CBL_j(t_i)$ is the Customer Base Line of resource j at time interval i ($t_i$) during an event period, and $P_j^{Obligation}$ is the obligation of resource j.

Continuing with FIG. 7A, a process 700 for determining whether the dispatched resources are not sufficient for meeting the dispatch obligation during the dispatch event, and that additional resources needed for meeting the obligations is provided. The process 700 provides a representation of the dynamic dispatch increase mechanism that is designed to respond to real-time performance under-achievement by committed facilities/resources.

At step 702 a demand response event is called by an RTO/ISO for a program where the service provider has enrolled customers. At step 704 the dynamic dispatch engine 120 determines which customers/facilities will be dispatched in what timeframe(s) to satisfy the RTO/ISO curtailment commitment and initiates the event with those targeted facilities. In some embodiments, several criteria can be used for determining which customers are dispatched, for example, including but are not limited to economic dispatch, performance ranking dispatch, available curtailment capability ranking dispatch, revenue-based dispatch. In some embodiments, dispatch can be calculated at different intervals based on frequency of available meter data: one minute, five minutes, 15 minutes, 30 minutes, and 60 minutes, and the customer determination for dispatch is made on those intervals.

At step 706, once the event is initiated, the system begins collecting RT (Real-Time) meter data for the dispatched facilities. At step 708, as RT meter data arrives within system 100, the system 100 can continually be checking to determine whether it is time to re-evaluate curtailment performance. If it is not time for evaluation, the system continues to read the RT meter data. If it is time to evaluate performance, it initiates a performance calculation. A performance evaluation can be triggered by pre-defined schedules or software operational cases.

At step 710, on a routine basis throughout the duration of the DR event, the system 100 executes a performance evaluation and evaluates the RT interval meter data compared to the committed curtailment target and the facility's last performance evaluation, triggered by a determined passage of time within the event. At step 712, if the system 100 determines that the dispatched facilities are not curtailing as much load as expected (or is trending that direction) and the service provider is not achieving the curtailment commitment made to the RTO/ISO (or is projecting danger of underperformance), the system 100 recognizes the state of being under-dispatched and initializes mitigation procedures, for example provided at steps 714-716. If the system 100 determines that curtailment performance is satisfactory and is not trending toward unsatisfactory performance, it continues collecting RT meter data and returns to step 706.

At step 714, if the system 100 determines that the proper mitigation strategy is to dispatch additional facilities to support the curtailment commitment, it initiates an additional dispatch procedure. In some embodiments, Additional dispatched procedures can be the output of step 716, it can be an additional dispatch schedule to the original dispatch schedules. If the system 100 determines that the current set of dispatched resources are expected to achieve the performance expectations, it continues to collect RT meter data. At step 716, if required, the system 100 selects the next most optimal facility(ies) using a recalculated dispatch schedule (similar to stage 704) and initiates a dispatch event with the required facilities to help ensure compliant dispatch performance levels against the RTO/ISO commitment. Once, the currently dispatched energy at the resource's/facilities energy are increased and the process can continue monitoring and adjusting as required and return to step 706

Referring to FIG. 7B, a process 750 for determining that the dispatched resources are more than sufficient for meeting the dispatch obligation during the demand response dispatch event, some resources can be withdrawn from dispatch event in order for customer to operate their businesses back to normal earlier. In other words, the process 750 is a representation of the dynamic dispatch decrease mechanism that is built to respond to real-time performance over-achievement by committed facilities/resources. At step 752 a demand response event is called by an RTO/ISO for a program where the service provider has enrolled customers.

At step 754, the dynamic dispatch engine 120 determines which customers/facilities will be scheduled/dispatched in what timeframe(s) to satisfy the RTO/ISO curtailment commitment and initiates the event with those targeted facilities. In some embodiments, the several criteria can be used for determining which customers are dispatched, these include but are not limited to economic dispatch, performance ranking dispatch, available curtailment capability ranking dispatch, revenue-based dispatch. In some embodiments, dispatch can be calculated at different intervals based on frequency of available meter data: one minute, five minutes, 15 minutes, 30 minutes, and 60 minutes, and the customer determination for dispatch is made on those intervals.

At step 756, once the dispatched event is initiated, the system 100 begins collecting RT (Real-Time) meter data for the dispatched facilities, for example, via meter telemetry systems. At step 758, as RT meter data arrives, the system 100 is continually checking to determine whether it is time to re-evaluate curtailment performance. The re-evaluation determination can be based on the performance obligation. Normally, the performance obligation can as the same as the dispatch obligation, sometimes, if over performance is expected, then the performance can be higher that the dispatch obligation, for example, an expected RT an expected RT meter reading range can be established, and once real-time meter reading arrives, if it is beyond the expected performance range, a re-evaluation process will be started to check the curtailment performance. If it is not time for evaluation, the system 100 continues to read RT meter data. If it is time to evaluate performance, it initiates a performance calculation.

At step 760, on a routine basis throughout the duration of the DR event, the system 100 executes a performance evaluation and evaluates the interval RT meter data compared to the committed curtailment target and the facility's last performance evaluation. In some embodiments, the last performance evaluation can be calculated by using the latest interval meter data and the performance obligation. The performance evaluation can be triggered by a determined passage of time within the event, for example, when it has been determined that it is time to evaluate performance (step 758).

At step 762, based on the performance calculation, the system can determine whether dispatched facilities are curtailing above the expect load level (or is trending that direction). If the system 100 determines that the dispatched facilities are curtailing well above the expected load level and the service provider is over-achieving the curtailment commitment made to the RTO/ISO (or is projecting danger of overperformance), the system 100 recognizes the state of being over-dispatched and initializes mitigation procedures, for example provided at steps 764-766. If the system 100 determines that curtailment performance is satisfactory and is not trending toward unsatisfactory performance, it continues collecting RT meter data and returning to step 756. In some embodiments, curtailment commitment satisfaction can be checked by comparing the real-time meter measurements against the curtailment commitment obligation(s) made to the RTO/ISO. Once the difference is beyond a given tolerance, it is considered unsatisfactory. This is a moving process of continually comparing the new, incoming RT meter measurements against the obligation. Performance trending is also performed to provide an early warning if the curtailment performance is moving toward unsatisfactory.

At step 764, if the system determines that the proper mitigation strategy is to decrease the currently dispatched facilities to better support the curtailment commitment, it initiates a dispatch reduction procedure, at step 766. If the system 100 determines that the current set of dispatched resources are expected to achieve the performance expectations, it continues to collect RT meter data and returns to step 756. At step 766, if required, the system selects the resources/facility(ies) using a recalculated dispatch schedule (similar to stage 754) that optimize achievement of the event requirements and ends the dispatch event with the released resources/facilities to help ensure compliant dispatch performance levels against the RTO/ISO commitment. Once the currently dispatched resource's/facilities energy consumption is decreased, the process can continue monitoring and adjusting as required and return to step 756.

In some embodiments, the portfolio risk assessment module 122 can perform processes related to resource commitment risk, portfolio commitment risk assessment, and portfolio dispatch risk assessment. In some embodiments, the resource commitment risk can be assessed by calculating resource risk factor by risk hours divided by all hours in a given time frame or by risk MW divided by total MW in a given time frame. In some embodiments, portfolio commitment risks can be assessed on an aggregated level. The portfolio risk factor over a period can be calculated by using hour risk factor or MW risk factor as defined by, for example, following equations:

$$\text{Hour Portfolio Commitment Risk} = \frac{\text{Portfolio Risk Hours}}{\text{Toral Hours}} \times 100\% \quad (24)$$

$$\text{Where: Portfolio Risk Hours} = \sum_{j=1}^{NH}\{I_k^j\}, \quad (25)$$

$$I_k^j = \begin{cases} 1, \text{ if } \Delta_k^j > 0 \\ 0, \text{ if}, \text{ if } \Delta^j \le 0 \end{cases}, \quad (26)$$

$$\text{and } \Delta^j = \quad (27)$$

$$\begin{cases} \sum_{k=1}^{NR}|\text{Meter}-CP-FSL|, \text{ for } FSL \text{ at Hour } j(j=1,2,\ldots,24) \\ \sum_{k=1}^{NR}\text{Max}\{\Delta_1, \Delta_2, \Delta_3\}, \text{ for } GLD \text{ at Hour } j(j=1,2,\ldots,24) \end{cases}$$

$$MW \text{ Portfolio Commitment Risk} = \frac{\text{Portfolio Risk } MWs}{\text{Total } MWs} \times 100\% \quad (28)$$

$$\text{Where: Portfolio Risk } MWs = \sum_{j=1}^{NH}\Delta MW_k^j \quad (29)$$

$$\text{and } \Delta MW_k^j = \begin{cases} \sum_{k=1}^{NR}|\Delta_k^j|, \text{ if } \Delta_k^j > 0 \\ 0, \text{ if } \Delta_k^j \le 0 \end{cases} (j=1,2,\ldots 24) \quad (30)$$

When using MW portfolio risk factor, financial risk can be calculated by risk MW multiplied by penalty price (currency/MW). In some embodiments, portfolio dispatch can be assessed by using MW portfolio commitment risk factor, for example, as defined in Equation (28). In some embodiments, financial risk of under-performance risk can be assessed by under-performed MW multiplied by dispatch penalty price (currency/MW). In some embodiments, penalty price can be a fixed number or a function of performance index.

In some embodiments, the risk assessment module 122 can be designed to conduct resource-level and portfolio-level risk management activities in consideration to the complexities of portfolio building under the model of the present disclosure. These assessments can be provided to inform decision-making around commitment and dispatch risks that exist given the conditions and positions established with a given market. The risk assessment module 122 can identify and quantify inherent risk profiles given specified scenarios, which provides the ability to balance revenue potential with exposure and effectively build strategies to optimize market positions.

Figure 8:
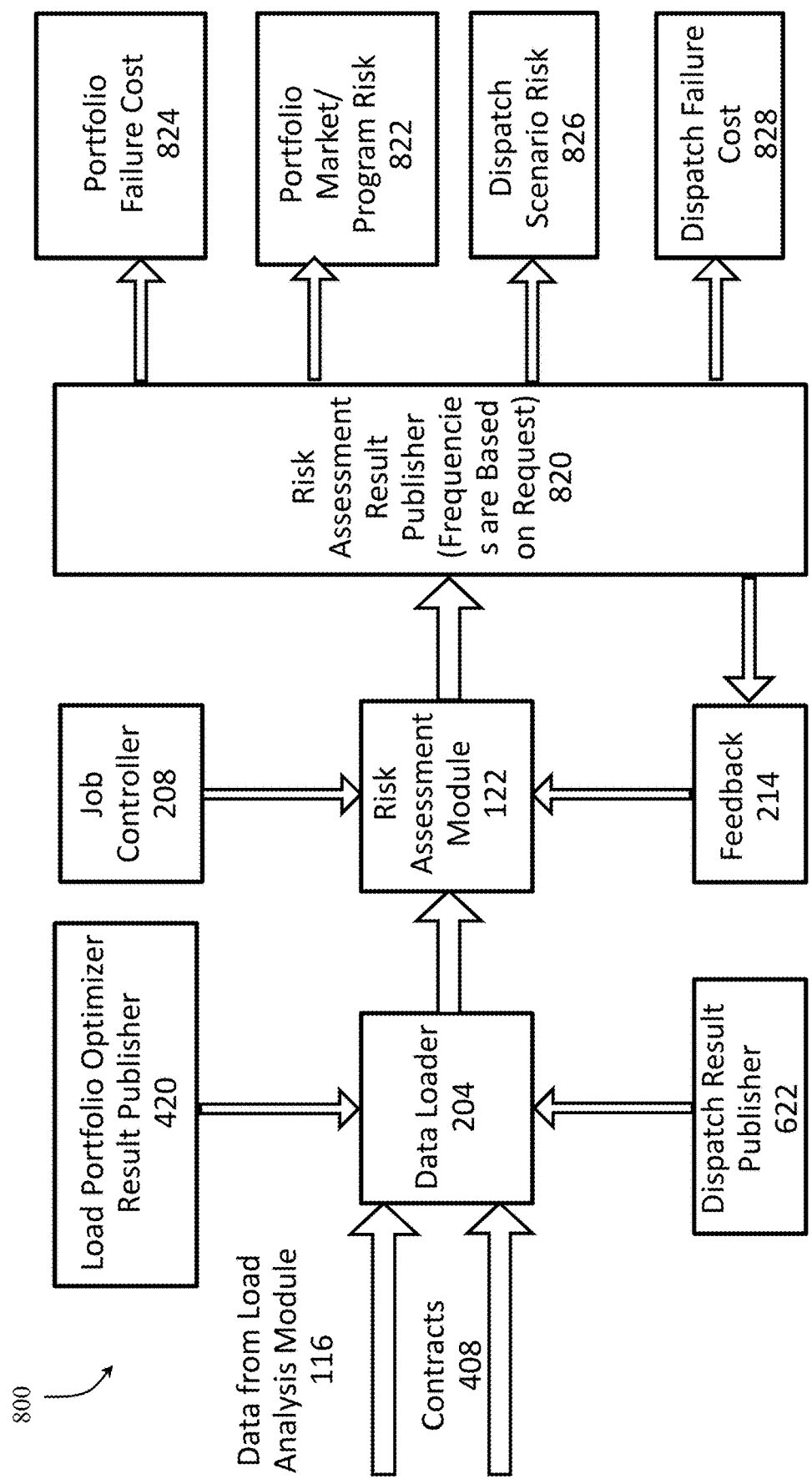
FIG. 8 is a flowchart depicting a method of performing risk management, in accordance with the present disclosure.

Referring to FIG. 8, in some embodiments, the risk assessment module 122 can assess portfolio risk exposures under different scenarios in the portfolio management process stages, (i.e., portfolio planning, portfolio scheduling, portfolio dispatch, etc.). FIG. 8 depicts an example architecture 800 diagram for the risk assessment module 122 assessing portfolio risk exposures. In some embodiments, the data loader 204 can load a combination of data needed for portfolio risk assessment, which can include the data and the results from the load analysis module 116, resource owner contracts 408 and grid market operation contracts (market penalty structures for under-performances) and obligation, portfolio planning and scheduling results, portfolio dispatch information and historical performance. FIG. 8 also shows the published results from the load portfolio (e.g., load portfolio optimizer result publisher 420) and dispatch (dispatch result publisher 622), but not the data load, such that all the data needed for load portfolio and dispatch is sufficient for risk assessment. Raw load data may not be directly used in risk assessment.

In some embodiments, the risk assessment module 122 can receive input data/instructions from the job controller 208. The job controller 208 can perform automatic process controls of risk assessment module 122 related calculations and optimizations. The automatic process controls are the software sequence execution process controls. There are multiple software processes need to start following certain sequence, which are configured in the job controller 208. The execution process can be triggered automatically by using timers and sequence controls. In some embodiments, the risk assessment module 122 can also receive input data from feedback 214. Feedback 214 can be an interface to exchange data (in/out) with risk assessment data module result publisher 820. The feedback 214 can be used to further optimize and tune the operation of the risk assessment module 122.

In some embodiments, the portfolio risk assessment module 122 can conduct risk calculations at portfolio levels based on the data inputs. The data inputs can include the data from the data loader 204, input from data/instructions from the job controller 208, and feedback received back through a feedback 214. In some embodiments, the risk assessment results can be published by the risk assessment publisher 820 as portfolio market/program risks 822, portfolio failure costs 824, dispatch scenarios risks 826, and dispatch failure costs 828. In some embodiments, the job controller 208 can be provided to manage risk calculation process by managing the software execution process. Risk assessment publisher 820 can receive data from the risk assessment module 122 to publish results in different formats such as reports, website GUI, and database. For example, the results can be a combination of portfolio failure cost 824, a portfolio marker/program risk 822, a dispatch scenario risk 826, and dispatch failure cost 828. Portfolio risk assessment results can help customer to understand risk level and financial impacts for each operational portfolio scenario and to minimize operational risk exposure. It also helps electric grid operation to remain under the operational risk level and to prepare remedy action plans to cover the risks.

Figure 9:
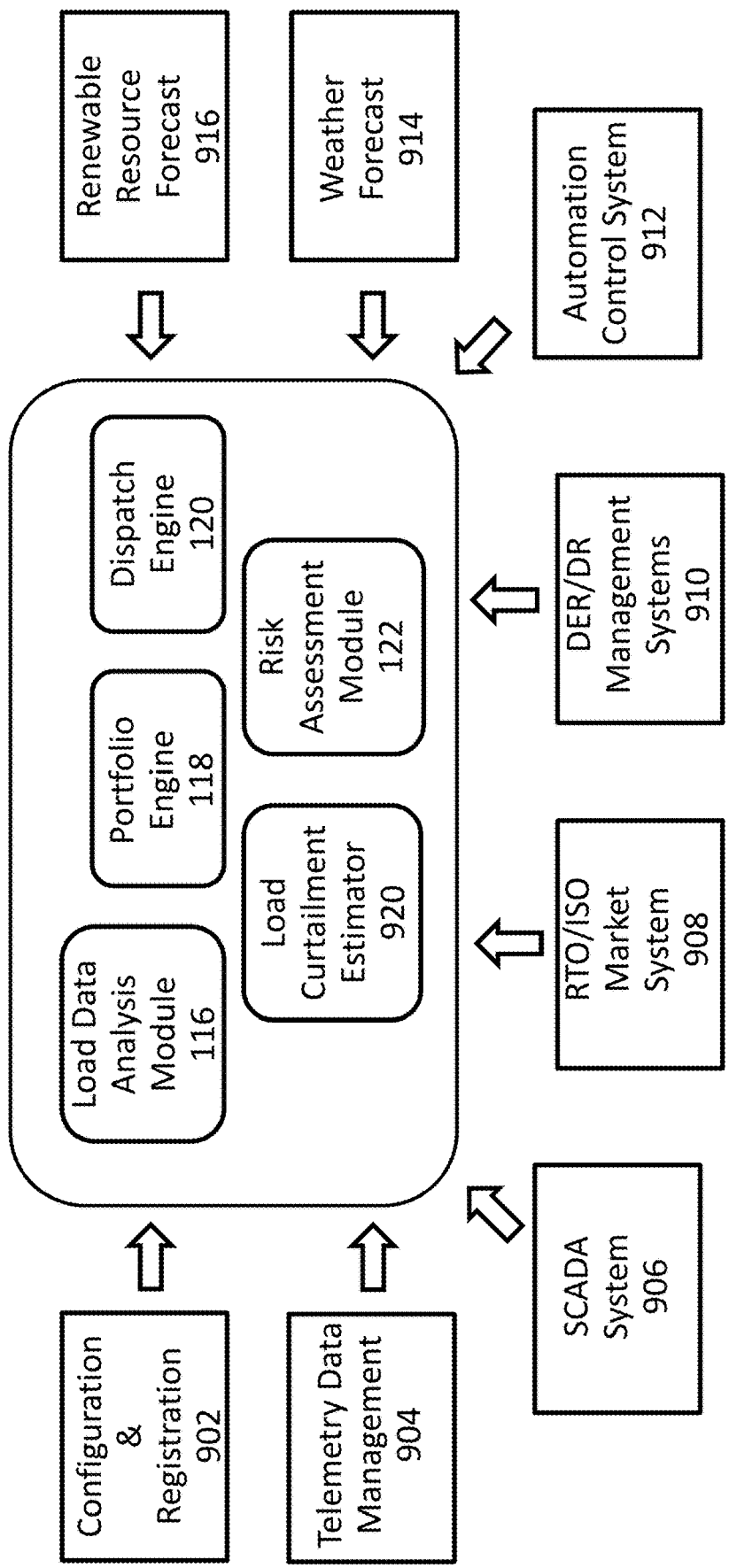
FIG. 9 is a flowchart depicting an architecture for the system integration module, in accordance with the present disclosure.

Referring to FIG. 9, in some embodiments, the system 100 can include a combination of the load data analysis module 116, the portfolio engine 118, the dispatch engine 120, the risk assessment module 112, and a load curtailment estimator 920 (i.e. load curtailment capability assessment, one of the outputs from the load data analysis module 116 described relative to FIG. 2A). These components can be designed to work together to provide the various calculations and benefits of the present disclosure, as discussed with respect to FIGS. 1-8.

In some embodiments, the system 100 can leverage data from third party sources for additional processing. The third party data sources can include configuration and registration system 902 for managing resource configurations and registration, as well as system configuration and registrations, such as for example, telemetry data management system 904 for managing different types of measurements such as energy usage, equipment status, and other electrical measurements used by demand response request management systems, SCADA system 906 for managing real-time data collections, calibrations, and automated controls, RTO/ISO market system 908 for managing ISO market operations and controls, DER/DR management system 910 for managing Distributed Energy Resources and remand resources, automation controls systems 912 for managing industrial automations and operations, weather forecast 914 for forecasting weather at different demand response request and DR locations, and renewable resource forecast 916 for forecasting hourly renewable resource generation outputs.

Figure 10:
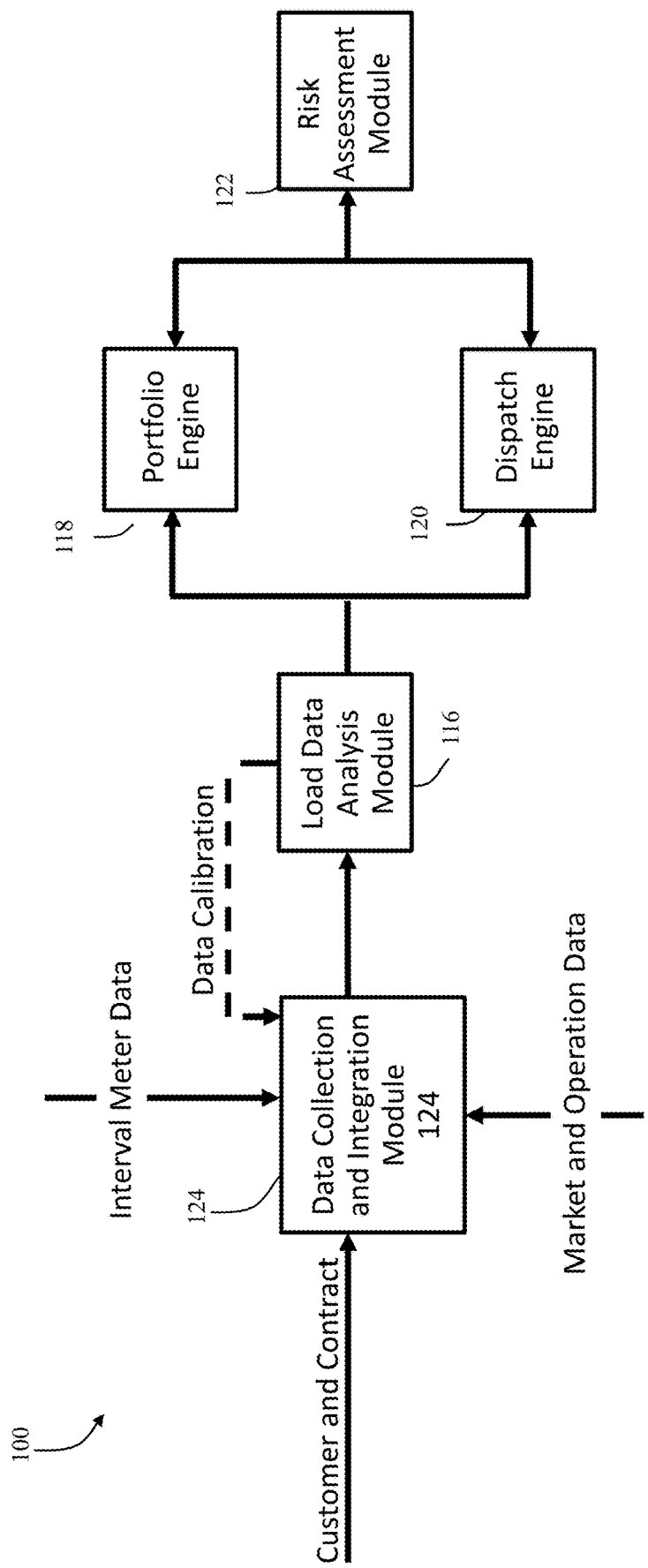
FIG. 10 is a flowchart depicting an architecture for the system integration module, in accordance with the present disclosure.

Referring to FIG. 10, in some embodiments, the system integration module 124 can monitor and manage each of the other modules and engines 116, 118, 120, 122. FIG. 10 depicts an example function architecture of the integration module 124 managing the different modules and engines 116, 118, 120, 122 and their relationship to one another. The system integration module 124 can be a comprehensive, fully integrated support system that allows the modules, engines, systems, and methods of the present disclosure to seamlessly synchronize with external data sources, utilize real-time pricing and metering, and affect active curtailment performance. Integrations with both in-house systems-of-record and dispatch control applications as well as connectivity to persistent field metering and ISO data allow for dynamic re-evaluation and management of the portfolio. An organization would benefit from the ongoing, real-time data consolidation and calculations, as well as the ease and speed of implementing any adjustments through automated interfacing with control systems.

Continuing with FIG. 10, an example diagram of the load data analysis module 116, the portfolio engine 118, the dispatch engine 120, and the risk assessment module 122 when being controlled by the system integration module 124. FIG. 10 also provides example processes executed by each of the modules and engines within the system 100. In some embodiments, the present disclosure can be operated as a software and system services, it can be also integrated with other system via Web service technology. The integration module 124 can be a software process to exchange data among different functions, modules, engines, etc. discussed herein (e.g., modules 116, 118, 120, 122) as well as the respective inputs and outs, such as the data loader 204, job controller 208, the various published outputs by respective publishers (e.g., 420). In order to run one function module, the static data (from either internal systems or external system via system APIs) and dynamic data (from the execution of other modules) are needed to be the inputs. The modules/engines can work in a combination to share data between one another to achieve the desired result. For example, some modules/engines can use the data from previous modules/engines, and other modules/engines can use the data from the raw data and execution results from other modules/engines. The various elements discussed with respect to FIGS. 2A-10 and used within the different architectures, such as those shown in FIGS. 2A, 4, 6, and 8-10. For example, the data loader 204 can be implemented in the architectures in FIGS. 2A, 4, 6, and 8 and can operate in similar manner in each of the architectures while loading different data contents depending on the processes being implemented. After execution of each module, the results and the data needed for other modules is saved in the database so that the other modules can retrieve the required data from database. There is some data that is common to all business application modules, but each module also has specific data which is just special to the module. The specialized data utilized is produced as an output of another, previously executed module(s).

In some embodiments, the data collection and integration module 124 can receive data inputs from numerous sources and/or data aggregated and stored in one or more databases (e.g., system storage 114). The collection and integration module 124 can receive and/or aggregate interval RT and/or historical meter data provided by one or more customer sites, resources, facilities, etc. The interval RT and/or historical meter data can be collected using any combination of methods, such as for example, smart meters. The collection and integration module 124 can receive and/or aggregate customer (e.g., profile data) and contract data (e.g., contract data 408). The collection and integration module 124 can receive and/or aggregate market and operation data. This can include market curtailment instructions, event or price signals, and market curtailment commitments, along with operational data from a customer site such as current load, planned outages, curtailment plan, etc. The collected interval RT and/or historical meter data, customer data, contract data, and market and operation data can include any combination of data from customers, energy providers, ISO, participating within the electric grid operation.

The data collection and integration module 124 can be provide the aggregated data to the various modules/engines to carry out the analysis, calculations, and report generation discussed with respect to FIGS. 2A-9 and 12A-13. In some embodiments, the data collection and integration module 124 can initially provide the input data to the load data analysis module 116, for example, to execute the process discussed with respect to FIGS. 2A and 3. In some embodiments, the load data analysis module 116 can provide feedback and results back to the data collection and integration module 124 for data calibration. The data calibration can include any combination of adjustments for optimizing the results for the load data analysis module 116 and other modules/engines being managed by the data collection and integration module 124.

In some embodiments, the data collection and integration module 124 and/or the load data analysis module 116 can provide data to the portfolio engine 118 and dispatch engine 120 for additional processing, for example, as discussed with respect to FIGS. 4 and 5 and 6, 7A, and 7B, respectively. The load data analysis module 116 can be designed to feed the portfolio engine 118 and dispatch engine 120 directly or there can an intermediate database that the load data analysis module 116 feeds and allows the portfolio engine 118 and dispatch engine 120 to pull data from as needed. In some embodiments, the data collection and integration module 124 and/or the portfolio engine 118 and dispatch engine can provide data/results to the risk assessment module 122 for additional processing, for example, as discussed with respect to FIG. 8. In some instances, there can be an intermediate DB between the portfolio engine 118 and dispatch engine 120 and the risk assessment module 122.

As would be appreciated by one skilled in the art, the calculations and functions provided herein are for example purposes for how the steps of the present disclosure could be carried out and are not intended to limit the scope of the present disclosure to use of the combination of functions included herein or the specifics of the functions themselves. The various calculations and functions discussed herein can be used in various combinations and/or can be modified to aggregate, calculate, derive, and compile results in various ways without departing from the scope of the present disclosure.

In operation, the platform of the present disclosure can be implemented by combining different business and application process for distributed energy resource operators to optimize resource operations. These processes can be integrated together as a unique platform. In some embodiments, the load analysis module 116 can provide base dataset for portfolio planning and scheduling, risk assessment helps portfolio operators to assess portfolio risks under different planning, operational, and dispatch scenarios.

In an example implementation, initially, a new customer can be contracted with a service provider implementing the present disclosure. The contracted customer can coordinate with the service provider to coordinate relevant operational, distributed energy resource, and curtailment capabilities and constraints to be collected and maintained in a central database (e.g., storage system 114). In addition, historical interval meter data (plus RT meter data if available) and market data is aggregated from the customers to be stored in an integrated manner to create a holistic customer profile. Using the customer profile, the system of the present disclosure can execute load data analysis to produce meaningful insights and correlations that feed into a forecasting algorithm to predict customer load behavior. Using this understanding of limitations and capabilities, the system can then aggregate the customer's profile with the rest of the customer portfolio and generate optimized market participation strategies, for example, as defined by the portfolio engine. In some embodiments, the system 100 can utilize the dispatch engine 120 to dynamically dispatch and control a customer's load in real-time to comply with energy market program participation rules and committed strategies as defined by the optimization outputs from the portfolio engine. Additionally, the aggregated and optimized portfolio, considering dynamic dispatch actions, can be assessed for risk introduction based on the current market and operational conditions across the portfolio.

Using these steps/processes discussed herein, the invention described herein can provide incremental benefits associated with increased customer conversions and higher participation rates. As energy markets continue to transition to more year-round demand response programs, customer participation will begin to be limited in the current form. Utilizing the methods and technologies identified herein will allow users to increase revenues through increased customer acquisition and participation in the changing market landscape.

Figure 11:
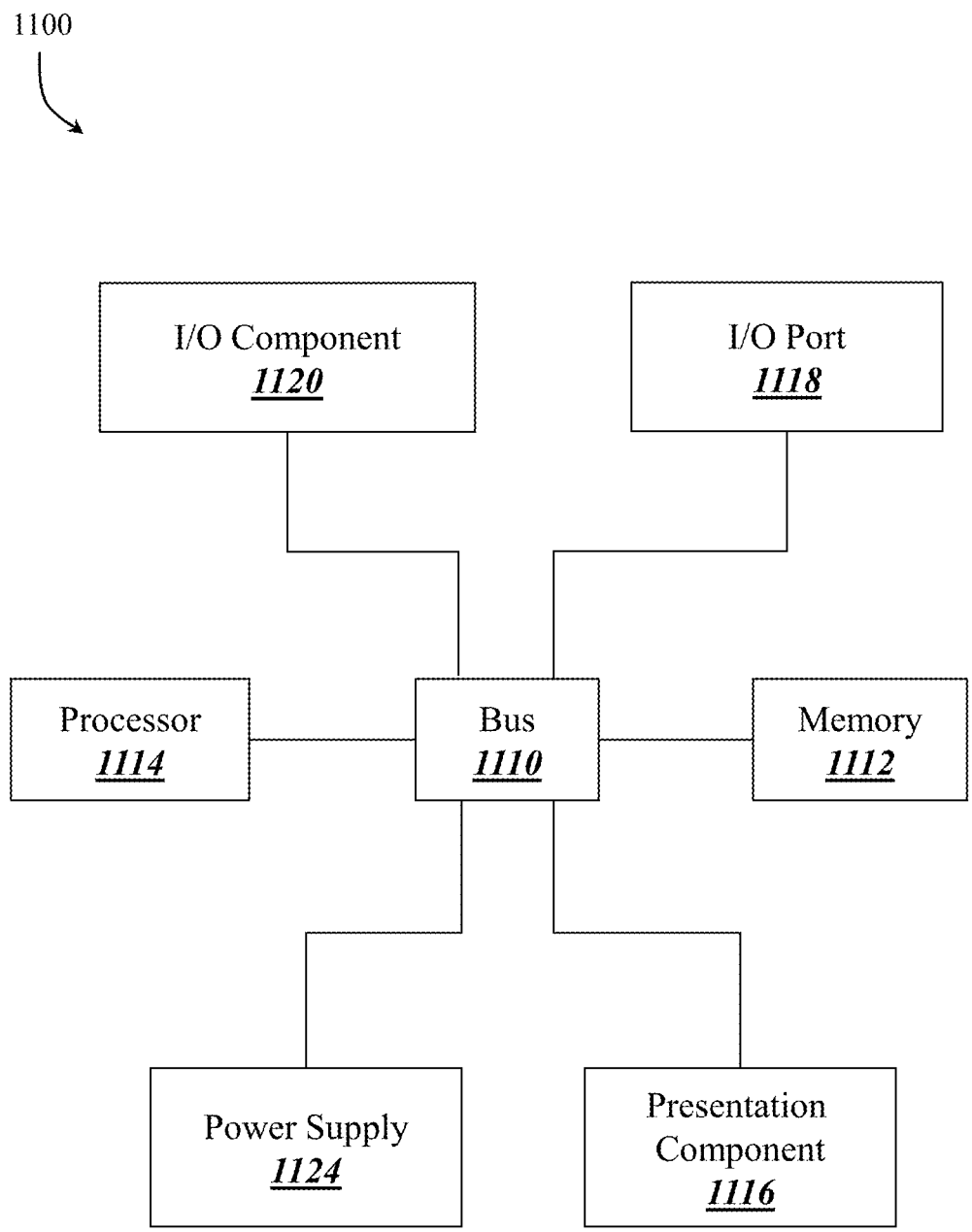
FIG. 11 is a diagrammatic illustration of a high-level architecture for implementing processes in accordance with the present disclosure.
Figure 12A:
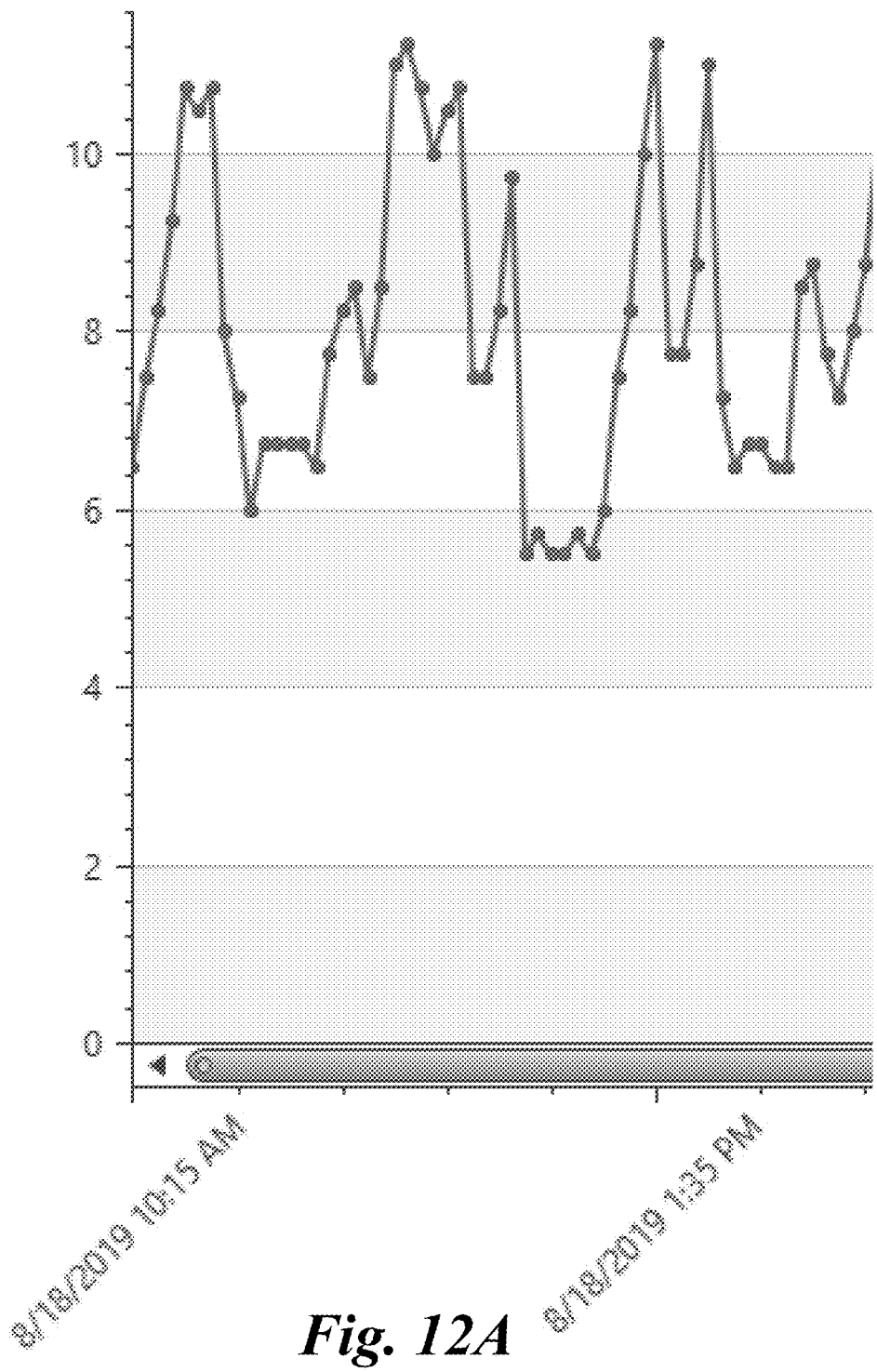
FIGS. 12A and 12B are plots showing the consumption rate per hour over time in accordance with the present disclosure.
Figure 12B:
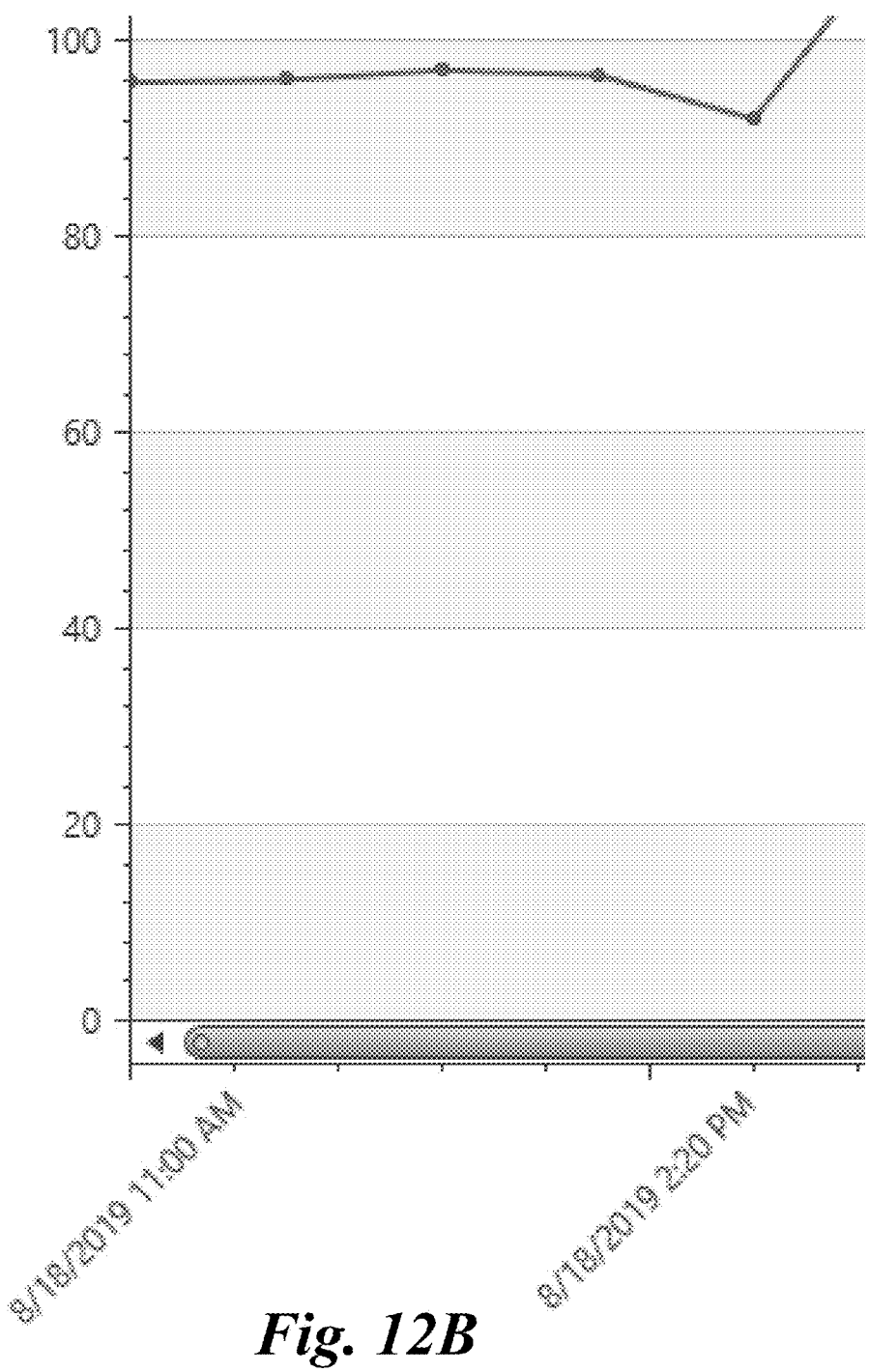

Any suitable computing device can be used to implement the computing systems/devices 100, 102, 126, the modules and engines, and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1100 is depicted in FIG. 11. The computing device 1100 is merely an illustrative example of a suitable computing environment and in no way limits the scope of the present disclosure. A "computing device," as represented by FIG. 11, can include a "workstation," a "server," a "laptop," a "desktop," a "hand-held device," a "mobile device," a "tablet computer," or other computing devices, as would be understood by those of skill in the art. Given that the computing device 1100 is depicted for illustrative purposes, embodiments of the present disclosure may utilize any number of computing devices 1100 in any number of different ways to implement a single embodiment of the present disclosure. Accordingly, embodiments of the present disclosure are not limited to a single computing device 1100, as would be appreciated by one with skill in the art, nor are they limited to a single type of implementation or configuration of the example computing device 1100.

The computing device 1100 can include a bus 1110 that can be coupled to one or more of the following illustrative components, directly or indirectly: a memory 1112, one or more processors 1114, one or more presentation components 1116, input/output ports 1118, input/output components 1120, and a power supply 1124. One of skill in the art will appreciate that the bus 1110 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 11 is merely illustrative of an exemplary computing device that can be used to implement one or more embodiments of the present disclosure, and in no way limits the invention.

The computing device 1100 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1100.

The memory 1112 can include computer-storage media in the form of volatile and/or nonvolatile memory. The memory 112 may be removable, non-removable, or any combination thereof. Exemplary hardware devices are devices such as hard drives, solid-state memory, optical-disc drives, and the like. The computing device 1100 can include one or more processors that read data from components such as the memory 1112, the various I/O components 1116, etc. Presentation component(s) 1116 present data indications to a user or other device. Exemplary presentation components include a display device, speaker, printing component, vibrating component, etc.

The I/O ports 1118 can enable the computing device 1100 to be logically coupled to other devices, such as I/O components 1120. Some of the I/O components 1120 can be built into the computing device 1100. Examples of such I/O components 1120 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present disclosure be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for optimizing resource operations, the system comprising:
   a database for aggregating meter data and customer information;
   a load data analysis module configured to:
      retrieve historical interval meter data, profile data, and a curtailment plan;

determine, using the historical interval meter data, estimated annual deviation of a customer's load based on average interval load in view of peak load over a given period;

calculate a load curtailment for the customer based on the estimated annual deviation of the customer's load, the historical interval meter data, the profile data, and the curtailment plan, build a report, using the load curtailment, indicating a resource commitment capability for the customer to help inform market participation and operational decision making for load curtailment and distributed energy resources (DER);

receive RT interval meter data from the customer's facility;

subtract an expected curtailment capability of the customer's facility from a contracted curtailment volume from the curtailment plan for that delivery season Guaranteed Load Drop (GLD) for a first value;

subtract the contracted curtailment volume for the delivery season Guaranteed Load Drop (GLD) from the RT interval meter data for a second value;

subtract the expected curtailment capability of the customer's facility from the RT interval meter data for a third value; and determine a maximum value from the first value, the second, value, and the third value to identify a performance risk currently exposed for the customer's facility, wherein the maximum value indicates a performance risk currently exposed for the customer's facility; and a portfolio engine for generating a commitment plan to be used (1) to optimize the customer's resources and to reduce energy consumption cost as a function of data from the load data analysis module and (2) to provide information for resource control system to perform control strategies to be implemented by the customer.

2. The system of claim 1, wherein the load data analysis module is further configured to:

receive real-time (RT) interval meter data from the customer's facility;

subtract the RT interval meter data from a contracted Firm Service Level (FSL) for the delivery season to calculate a variance of the customer's expected curtailment capability; and calculate an over-commitment or an under-commitment based on the subtraction.

3. The system of claim 1, wherein the portfolio engine for resource portfolio aggregation optimization is configured to:

receive an objective function selection;

receive resource commitment capability report, resource costs data, resource portfolio data, and resource portfolio commitment requirements;

build an optimization object function based on the resource portfolio commitment requirements;

build a constraint set for the objective function selection;

solve the optimization object function using the constraint set; and build the commitment plan using the solved the optimization object function.

4. The system of claim 3, wherein:

building the constraint set comprises using an aggregation of resource commitments, operational limitations, and regulation limitations to build objective functions to maximize portfolio revenues, minimize portfolio operation cost, and maximize portfolio energy usage.

5. The system of claim 1, further comprising a dispatch engine for conducting real-time portfolio operation monitoring and controls, the dispatch engine configured to:

receive a dispatch response event for the customer's facility;

collect RT interval meter data from the customer's facility;

compare the RT interval meter data to an enrolled curtailment commitment; and determine, based on the comparison, whether the RT interval meter data is sufficient to satisfy an obligation for the dispatch response event.

6. The system of claim 5, wherein the dispatch engine is configured to:

initialize mitigation procedures to dispatch additional facilities if the RT interval meter data is insufficient to satisfy the obligation; and initialize mitigation procedures to decrease a number of facilities if the RT interval meter data is more than sufficient to satisfy the obligation.

7. A method for optimizing resource operations, the method comprising:

retrieving, by a load data analysis module, historical interval meter data, profile data, and a curtailment plan;

determining using the historical interval meter data, by the load data analysis module, estimated annual deviation of a customer's load based on average interval load in view of peak load over a given period;

calculating, by the load data analysis module, a load curtailment for the customer based on the historical interval meter data, the profile data, the curtailment plan, and the estimated annual deviation of the customer's load;

building a report using the load curtailment, by the load data analysis module, indicating a resource commitment capability for the customer to help inform market participation and operational decision making for load curtailment and distributed energy resources (DER);

receiving, by the load data analysis module, RT interval meter data from the customer's facility;

subtracting, by the load data analysis module, an expected curtailment capability of the customer's facility from a contracted curtailment volume from the curtailment plan for that delivery season Guaranteed Load Drop (GLD) for a first value;

subtracting, by the load data analysis module, the contracted curtailment volume for the delivery season Guaranteed Load Drop (GLD) from the RT interval meter data for a second value;

subtracting, by the load data analysis module, the expected curtailment capability of the customer's facility from the RT interval meter data for a third value;

determining, by the load data analysis module, a maximum value from the first value, the second, value, and the third value to identify a performance risk currently exposed for the customer's facility, wherein the maximum value indicates a performance risk currently exposed for the customer's facility; and generating, with a portfolio engine, a commitment plan to be used (1) to optimize the customer's resources and to reduce energy consumption cost as a function of data retrieved by the load data analysis module and (2) to provide information for resource control system to perform control strategies to be implemented by the customer.

8. The method of claim 7, further comprising:
receiving, by the load data analysis module, real-time (RT) interval meter data from the customer's facility;
subtracting, by the load data analysis module, the RT interval meter data from a contracted Firm Service Level (FSL) for the delivery season to calculate a variance of the customer's expected curtailment capability; and
calculating, by the load data analysis module, an over-commitment or an under-commitment based on the subtraction.

9. The method of claim 7, further comprising:
receiving, by the portfolio engine, an objective function selection;
receiving, by the portfolio engine, resource commitment capability report, resource costs data, resource portfolio data, and resource portfolio commitment requirements; and
building, by the portfolio engine, an optimization object function based on the resource portfolio commitment requirements;
building, by the portfolio engine, a constraint set for the objective function selection;
solving, by the portfolio engine, the optimization object function using the constraint set; and
building, by the portfolio engine, the commitment plan using the solved the optimization object function.

10. The method of claim 9, wherein:
building the constraint set comprises using an aggregation of resource commitments, operational limitations, and regulation limitations to build objective functions to maximize portfolio revenues, minimize portfolio operation cost, and maximize portfolio energy usage.

11. The method of claim 9, further comprising:
receiving, by a dispatch engine, a dispatch response event for the customer's facility;
collecting, by the dispatch engine, RT interval meter data from the customer's facility;
comparing, by the dispatch engine, the RT interval meter data to an enrolled curtailment commitment; and
determining, by the dispatch engine, whether the RT interval meter data is sufficient to satisfy an obligation for the dispatch response event, based on the comparison.

12. The method of claim 11, further comprising:
initializing, by the dispatch engine, mitigation procedures to dispatch additional facilities if the RT interval meter data is insufficient to satisfy the obligation; and
initializing, by the dispatch engine, mitigation procedures to decrease a number of facilities if the RT interval meter data is more than sufficient to satisfy the obligation.

* * * * *